(12) United States Patent
Farhadiroushan et al.

(10) Patent No.: US 10,883,861 B2
(45) Date of Patent: Jan. 5, 2021

(54) METHOD AND APPARATUS FOR OPTICAL SENSING

(71) Applicant: Silixa Ltd., Elstree Hertfordshire (GB)

(72) Inventors: Mahmoud Farhadiroushan, Elstree (GB); Tom Parker, Elstree (GB); Sergey Shatalin, Elstree (GB)

(73) Assignee: Silixa Ltd., Elstree Hertfordshire (GB)

(*) Notice: Subject to any disclaimer, the term of this patent is extended or adjusted under 35 U.S.C. 154(b) by 290 days.

(21) Appl. No.: 15/555,628

(22) PCT Filed: Mar. 7, 2016

(86) PCT No.: PCT/GB2016/050625
§ 371 (c)(1),
(2) Date: Sep. 5, 2017

(87) PCT Pub. No.: WO2016/142695
PCT Pub. Date: Sep. 15, 2016

(65) Prior Publication Data
US 2018/0045543 A1 Feb. 15, 2018

(30) Foreign Application Priority Data

Mar. 6, 2015 (GB) .................... 1503861.5

(51) Int. Cl.
*G01D 5/353* (2006.01)
*G01H 9/00* (2006.01)
(52) U.S. Cl.
CPC ....... *G01D 5/35374* (2013.01); *G01D 5/3537* (2013.01); *G01D 5/35306* (2013.01); *G01H 9/004* (2013.01)
(58) Field of Classification Search
CPC ......... G01D 5/353374; G01D 5/35383; G01D 5/3506; G01D 5/35309; G01D 5/3512;
(Continued)

(56) References Cited

U.S. PATENT DOCUMENTS 4,996,419 A 2/1991 Morey
5,345,522 A 9/1994 Vali et al.
(Continued)

FOREIGN PATENT DOCUMENTS

CN 1183548 A 6/1998
EP 1350084 A2 10/2003
(Continued)

OTHER PUBLICATIONS

Intellectual Property Office of the United Kingdom. Search Report for Application No. GB1503861.5, dated Dec. 24, 2015.
(Continued)

*Primary Examiner* — Stephen D Meier
*Assistant Examiner* — Rose M Miller
(74) *Attorney, Agent, or Firm* — Honigman LLP; Brandon C. Griffith; Jonathan P. O'Brien

(57) ABSTRACT

An optical fiber distributed acoustic sensor system includes weak broadband reflectors inserted periodically along the fiber. The reflectors reflect only a small proportion of the light from the DAS incident thereon back along the fiber, typically in the region of 0.001% to 0.1%, but preferably around 0.01% reflectivity per reflector. In addition, to allow for temperate compensation to ensure that the same reflectivity is obtained if the temperature changes, the reflection bandwidth is relatively broadband. In some embodiments the reflectors are formed from a series of fiber Bragg gratings, each with a different center reflecting frequency, the reflecting frequencies and bandwidths of the gratings being selected to provide the broadband reflection. A chirped grating may also be used to provide the same effect. In preferred embodiments, the reflectors are spaced at half the gauge length i.e. the desired spatial resolution of the optical fiber DAS.

19 Claims, 34 Drawing Sheets

(58) Field of Classification Search
CPC .... G01D 5/35316; G01H 9/004; G01H 9/002; G01N 29/2418; G01N 29/2425; G01N 21/1702; G01N 21/1704; G01N 21/1706
USPC .......................................... 73/655, 657, 643
See application file for complete search history.

(56) References Cited

U.S. PATENT DOCUMENTS

| | | | |
|---|---|---|---|
| 5,560,712 A * | 10/1996 | Kleinerman | G01J 5/08 250/227.14 |
| 5,684,297 A | 11/1997 | Tardy | |
| 5,757,487 A | 5/1998 | Kersey | |
| 6,285,806 B1 | 9/2001 | Kersey et al. | |
| 2003/0035628 A1 | 2/2003 | Putnam et al. | |
| 2003/0210864 A1 | 11/2003 | Sugden et al. | |
| 2009/0129778 A1* | 5/2009 | Phillips | H04B 10/2507 398/65 |
| 2012/0274926 A1 | 11/2012 | Li et al. | |
| 2013/0292555 A1 | 11/2013 | Akkaya et al. | |
| 2014/0152995 A1 | 6/2014 | Dong et al. | |
| 2015/0285683 A1* | 10/2015 | Ouellette | G01J 3/0218 356/451 |

FOREIGN PATENT DOCUMENTS

| | | |
|---|---|---|
| GB | 2348000 A | 9/2000 |
| GB | 2489749 A | 10/2012 |
| GB | 2500484 A | 9/2013 |
| KR | 100387187 B1 | 6/2003 |
| KR | 101203700 B1 | 11/2012 |
| WO | WO-8902067 A1 | 3/1989 |
| WO | WO-2011047255 A2 | 4/2011 |
| WO | WO-2011058322 A2 | 5/2011 |
| WO | WO-2012033718 A1 | 3/2012 |
| WO | WO-2013131085 A1 | 9/2013 |
| WO | WO-2015149162 A1 | 10/2015 |

OTHER PUBLICATIONS

International Searching Authority, International Search Report for Application No. PCT/GB2016/050625, dated Aug. 9, 2016.
The Federal Institute of Industrial Property (RU), Office Action for RU Application No. 2017131560/28(055337), dated Jul. 9, 2019.
China National Intellectual Property Administration, First Notification of Office Action and Search Report for CN Application No. 201680014100.7, dated Jun. 21, 2019.
Intellectual Property Office of the United Kingdom. Patents Act 1977: Examination Report under Section 18(3) for Application No. GB1713118.6, dated Jun. 24, 2020.
Australian Government, IP Australia, Examination report No. 1 for standard patent application for AU Application No. 2016230883, dated Jul. 2, 2020.

* cited by examiner

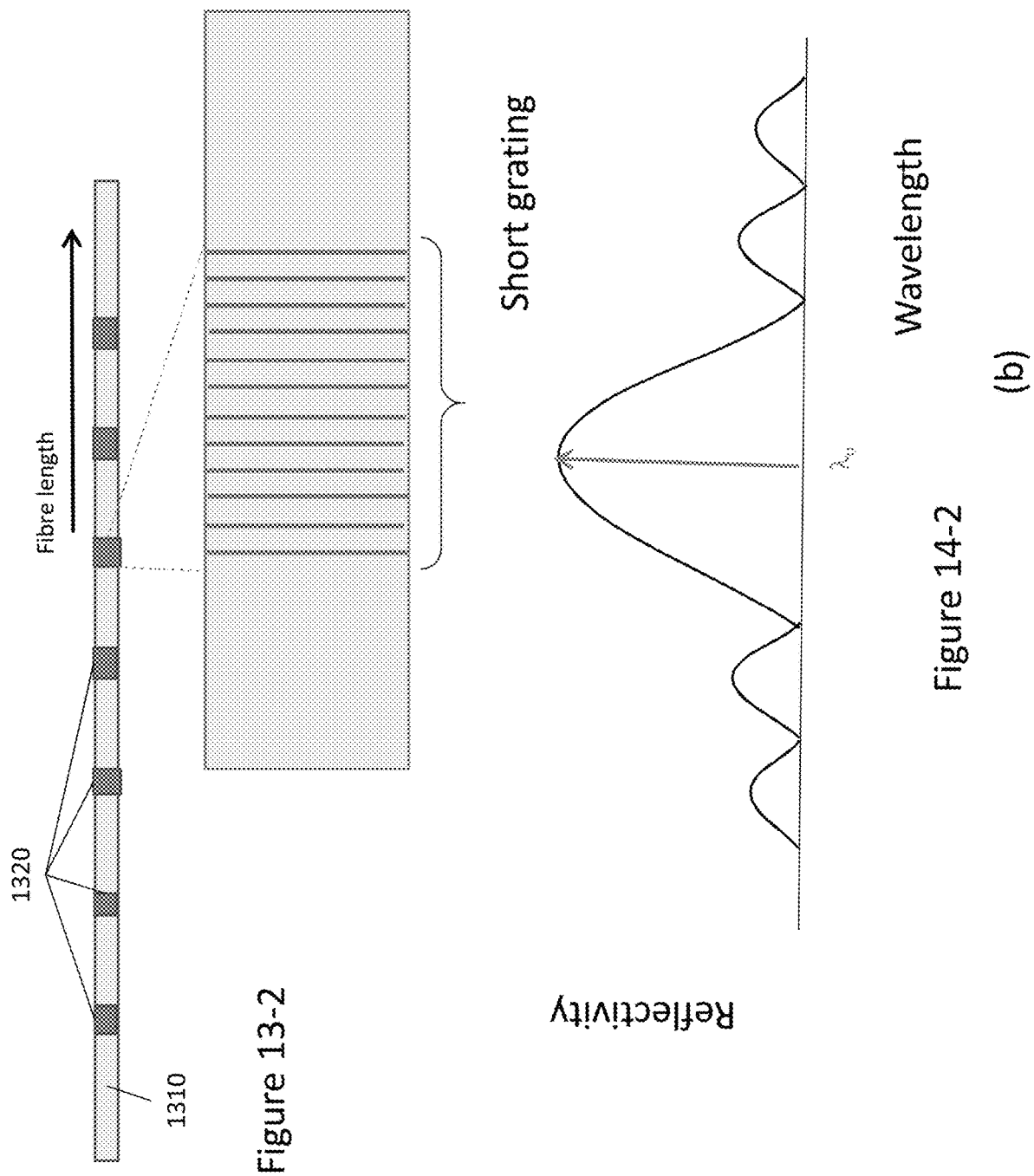

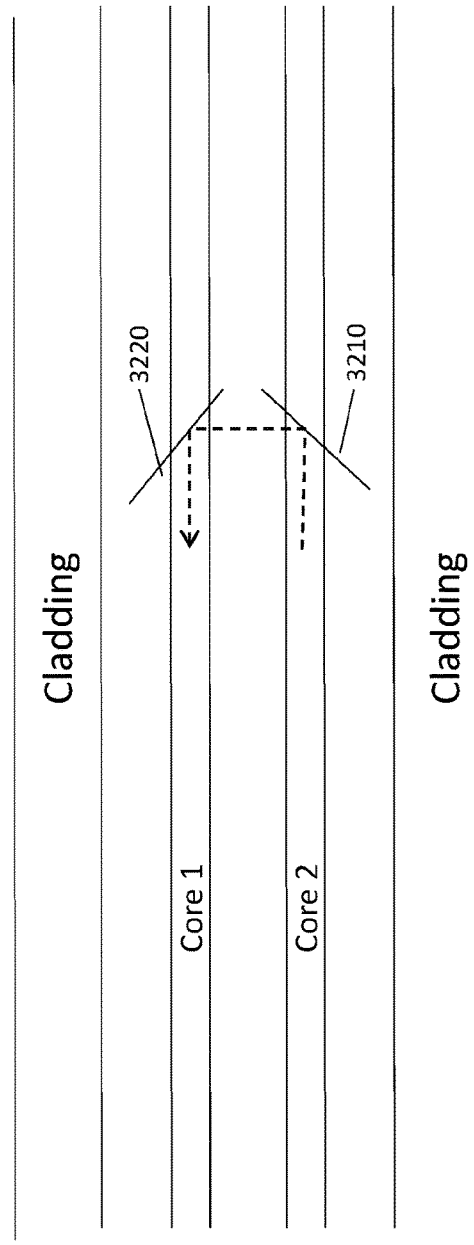
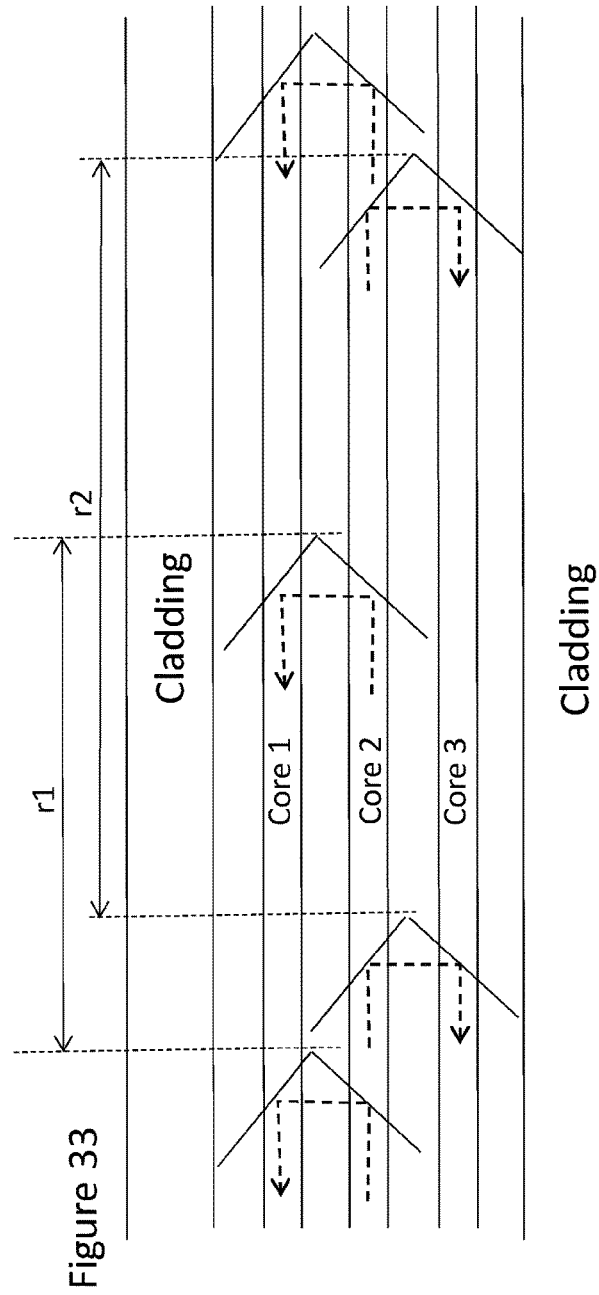

METHOD AND APPARATUS FOR OPTICAL SENSING

CROSS REFERENCE TO RELATED APPLICATIONS

The present application is a national stage application of PCT International Application No. PCT/GB2016/050625, filed on Mar. 7, 2016 which claims priority to United Kingdom Patent Application No. 1503861.5, filed in the United Kingdom Intellectual Property Office on Mar. 6, 2015, the disclosures of which are hereby incorporated by reference in their entirety.

TECHNICAL FIELD

Embodiments of the present invention relate to distributed optical fibre sensors, and in particular in some embodiments to such sensors with reflective elements integrated into the sensing optical fiber.

BACKGROUND TO THE INVENTION AND PRIOR ART

Optical fiber based distributed sensor systems are finding many applications, in particular in the oil and gas industry for flow monitoring and seismic detection, and in the security industry for area or perimeter security monitoring, or monitoring along a long line such as a pipeline or railway line. The present applicant, Silixa Ltd, of Elstree, London, markets two optical fiber distributed sensing systems, the Silixa® iDAS™ system, which is a very sensitive optical fiber distributed acoustic sensor, and the Silixa® Ultima™ system, which is a distributed optical fiber based temperature sensor. Further details of the iDAS™ system are available at the priority date at www.silixa.com/technology/idas/, and further details of the Ultima™ system are available at the priority date at www.silixa.com/technology/dts/. In addition, the present applicant's earlier International patent application WO 2010/136810 gives further technical details of the operation of its distributed acoustic sensor system, the entire contents of which necessary for understanding the present invention being incorporated herein by reference.

The Silixa® iDAS™ system is presently class leading in terms of spatial resolution, frequency response, and sensitivity and is capable of resolving individual acoustic signals with a spatial resolution of down to 1 m along the length of the fiber, at frequencies up to 100 kHz. However, it is always desirable to try and improve the performance in terms of the any of the resolution, frequency response, or sensitivity parameters noted.

SUMMARY OF THE INVENTION

Embodiments of the invention provide an improved optical fiber distributed acoustic sensor system that makes use of a specially designed optical fiber to improve overall sensitivity of the system, in some embodiments by a factor in excess of 10. This is achieved by inserting into the fiber weak (by which we mean of low reflectivity) broadband reflectors periodically along the fiber. The reflectors reflect only a small proportion of the light from the DAS incident thereon back along the fiber, typically in the region of 0.001% to 0.1%, but preferably around 0.01% reflectivity per reflector. In addition, to allow for temperature compensation, the reflection bandwidth is relatively broadband i.e. equal or greater than the region of +/−2 nm, preferably as large as +/−5 nm from the nominal laser wavelength. This provides for temperature dependent reflectivity of the reflectors to be accommodated, particularly where the reflectors are formed from gratings, that are known to often exhibit temperature dependence of the reflected wavelength over a broad e.g. +/−2 nm bandwidth. In some embodiments the reflectors are formed from a series of fiber Bragg gratings, each with a different center reflecting frequency, the reflecting frequencies and bandwidths of the gratings being selected to provide the broadband reflection. In other embodiments a chirped grating may also be used to provide the same effect. In other embodiments a short grating with low reflectivity and broad bandwidth may be written into the sensing fibre using femtosecond laser writing process. In some embodiments, the reflectors are spaced at the gauge length i.e. the desired spatial resolution of the optical fiber DAS, in other embodiments the reflectors are spaced at a distance calculated in dependence on the gauge length, for example as a fraction or multiple thereof.

In addition, some embodiments allow for either dual spatial resolution operation, or spatial resolution selectivity. These effects are obtained by controlling the virtual timing characteristics between the reflections obtained from the reflectors as an optical pulse travels along the optical fiber. In particular, in one embodiment of the invention an optical pulse is launched along the fiber and reflects from the reflectors in turn as it travels therealong. These reflections are received at a distributed acoustic sensing system, and are subject to a known delay, to provide a delayed version of the reflections, which is then interfered with the non-delayed version to obtain an output signal. The delay applied is referred to as the gauge length. The delayed version can therefore be thought of as a virtual pulse that "follows" the actual pulse, but separated therefrom by the gauge length. The delay, or gauge length, between the actual pulse and the virtual pulse defines the spatial resolution that is obtained from the system. By controlling the gauge length with respect to the known spacing of the reflector portions, spatial resolution selectivity, or dual resolution operation may be obtained. In particular, the gauge length may be controlled such that the effective pulse separation (i.e. the timing difference or delay between the original pulse and the delayed pulse) is adjusted to encompass a desired pair of reflector portions, for example to alter the spatial resolution as desired. Dual spatial resolution operation is obtained by setting the gauge length to particular values that mean that first and second sensing resolutions are obtained alternately as a pulse travels along the fiber.

In view of the above, in some embodiments there is provided an optical fiber distributed acoustic sensor system, comprising: an optical source arranged in use to produce optical signal pulses; an optical fiber deployable in use in a sensing environment and arranged in use to receive the optical signal pulses; and sensing apparatus arranged in use to detect light from the optical signal pulses reflected back along the optical fiber and to determine acoustic signals incident on the optical fiber in dependence on the reflected light; the system being characterized in that the optical fiber comprises a plurality of reflector portions regularly distributed along its length in at least a first sensing region thereof.

Further features, embodiments, and advantages of the present invention will be apparent from the appended claims.

BRIEF DESCRIPTION OF THE DRAWINGS

Embodiments of the invention will now be described with reference to the accompanying drawings, wherein like reference numerals refer to like parts, and wherein:

FIG. 13-1 is a diagram illustrating an embodiment fiber of the present invention;

FIG. 13-2 is a diagram illustrating a further embodiment fiber of the present invention;

FIG. 14-1 is a diagram illustrating the reflection bands of a series of fiber Bragg gratings used in an embodiment of the invention;

FIG. 14-2 is a diagram illustrating the reflection bands of short fiber Bragg gratings used in an embodiment of the invention;

FIGS. 21-1A to J illustrate dual-resolution results be obtained by an embodiment of the invention;

FIG. 21-2 illustrates the dual-resolution where the laser pulse is chopped in the region where there is no overlap in the reflected region

FIGS. 32 and 33 are embodiments showing how the reflectors may be used to provide backscatter free return channels in multimode and multi-core fibers;

FIGS. 34-1 and 34-2(*a*) and (*b*) show how the resolution can be selected by using gratings of different reflection bandwidths around the laser frequency

OVERVIEW OF EMBODIMENTS

Figure 1:
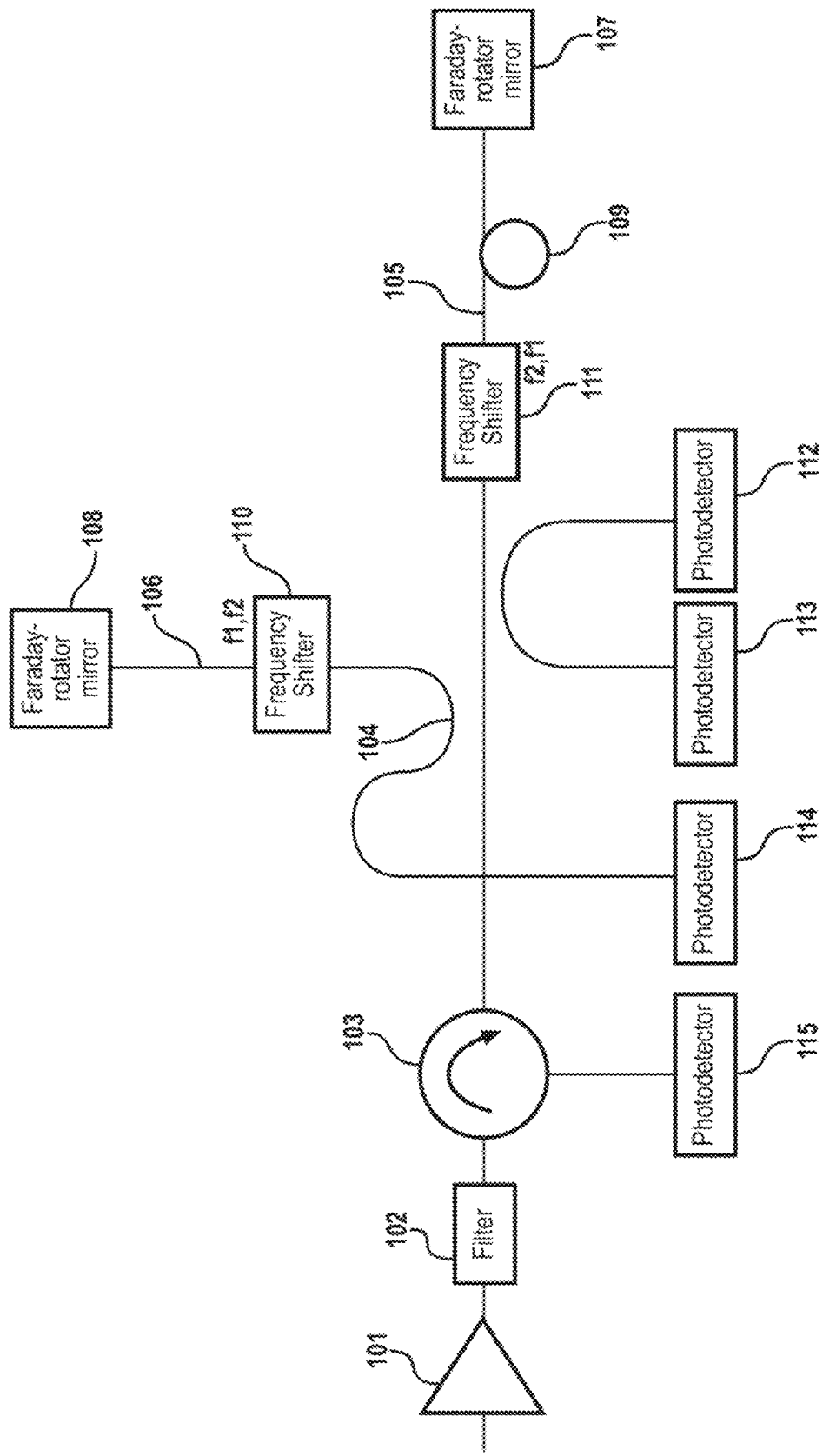
FIGS. 1, 2, 3 and 4 show schematic interferometer apparatus related to embodiments of the invention, comprising circulators and multiple fibre couplers with different optical paths through the interferometers, Faraday-rotator mirrors and photodetectors.

Embodiments of the invention provide an improved optical fiber distributed sensor, and in some embodiments an optical fiber distributed acoustic sensor that improves on the Silixa® iDAS™ system described in WO 2010/136810, by improving the signal to noise ratio. This is accomplished by using a sensing fiber having a number of weak, relatively broadband reflection points along the length thereof, spaced generally at the same distance as the gauge length, being the path length delay applied to the reflected pulse in one arm of the interferometer of the DAS system, and which in turn relates to the spatial resolution obtained. Due to the weak reflectivity (around 0.01% reflectivity is envisaged), the reflection loss along the fiber is small, and hence thousands of reflection point may be introduced. For example, for a sensing resolution of 10 m, 1000 reflection points gives an excess loss of just 0.4 dB, and a sensing length is obtained of 10 km. The processing performed in the DAS system is substantially identical to that performed on backscatter signals from along a standard fiber, but because there is a deliberate reflection back along the fiber rather than a scattering, a greater amount of reflected signal is received back at the DAS box, that is also more stable, both factors of which contribute to the increase in signal to noise performance. A specific aspect that helps to increase SNR further is that because the reflection points are fixed along the fiber then 1/f noise that is due to the fundamental nature of random backscattering is reduced to an unmeasurable level. This helps reduce the noise floor of the signal of the processed signal. Hence, by increasing the optical signal level in combination with the reduction in 1/f noise, total signal to noise ratio is increased. Tests of the technique show that an improvement in signal to noise ratio in excess of a factor of 10 is achieved.

Regarding the nature of reflection points, in some embodiments a series of Fiber Bragg Gratings (FBGs) are used for each reflection point, with a different peak reflection wavelength but with overlapping reflection bandwidths, the gratings being written into the fiber next to each other, separated by a small amount, of the order of 5 to 15 mm, and preferably around 10 mm. Where 5 gratings are used with a 10 mm separation between them, the total length of each reflection point is around 45 mm, and the total reflection bandwidth allowing for the overlapping reflection bandwidths of the individual gratings is around +/−2 nm, although in some embodiments it can be as wide as at least +/−5 nm. In other embodiments ideally a single, relatively weak broadband reflector would be used; for example a chirped grating or a short, broadband, weakly reflecting mirror less than 1 mm and typically 1000 m in length. Further embodiments are described below.

The use of reflection points along the fiber also opens up other possibilities, particularly concerning the spatial resolution of the DAS. For example, in some embodiments a simultaneous dual-resolution arrangement can be provided, by selection of appropriate gauge length and pulse width with respect to the spacing of the reflector portions along the fiber. For example, for a given reflector spacing L, provided the pulse width is less than L, for example around 0.75 L, and further provided that the gauge length, i.e. the difference in length between different arms of the interferometer in the DAS, which in turn relates to the spatial resolution, is chosen such that the reflected light and the delayed version thereof in the interferometer have been consecutively reflected from neighbouring reflection points and then non-neighbouring reflection points, then multi-resolution performance will be successively obtained. For example, where L is 10 m, pulse width is 7.5 m, and gauge length (effective virtual pulse separation in the interferometer corresponding to interferometer path length difference) is 15 m, then alternating 10 m and 20 m resolution performance is obtained as the pulses travel along the fiber.

In other embodiments the control of pulse timing characteristics with respect to reflector separation allows for resolution selectivity. In these embodiments, the reflector separations can be smaller than the initial gauge length, such that a first spatial resolution is obtained, but by then reducing the gauge length to match the smaller pitch of the reflectors then a second, improved, resolution is obtained. Providing a denser spatial distribution of reflectors therefore allows selective spatial resolution from the same fiber. In preferred embodiments, the reflectors are spaced at half the gauge length i.e. at half the desired spatial resolution of the optical fiber DAS.

In view of the above, and given the fact that the distributed acoustic sensor can be identical to those described previously, in the detailed description of embodiments given below a distributed acoustic sensor as described in WO 2010/136810 is described for completeness with respect to FIGS. 1 to 12, and then further description is undertaken of the fiber provided by embodiments of the present invention, and how the distributed acoustic sensor systems of the described embodiments may be further adapted to accommodate use of the described fiber as the sensing fiber to obtain the improved sensitivity and spatial resolution enhancements.

DETAILED DESCRIPTION OF EMBODIMENTS

FIG. 1 shows a first embodiment, generally depicted at 100, of an interferometer for measuring the optical amplitude, phase and frequency of an optical signal. The incoming light from a light source (not shown) is preferably amplified in an optical amplifier 101, and transmitted to the optical filter 102. The filter 102 filters the out of band Amplified Spontaneous Emission noise (ASE) of the amplifier 101. The light then enters into an optical circulator 103 which is connected to a 3×3 optical coupler 104. A portion of the light is directed to the photodetector 112 to monitor the light intensity of the input light. The other portions of light are directed along first and second optical paths 105 and 106, with a path length difference (109) between the two paths. The path length difference therefore introduces a delay into one arm 105 of the interferometer, such that the light that is reflected back for interference at any one time in that arm 105 is from a point closer along the fiber than the light available for interference in the other arm 106. This difference in length between the arms of the interferometer relates to (but is not quite equal to) the spatial resolution obtained, and is referred to herein as the gauge length. Faraday-rotator mirrors (FRMs) 107 and 108 at the ends of the interferometer arms reflect the light back through the first and second paths 105 and 106, respectively. The Faraday rotator mirrors provide self-polarisation compensation along optical paths 105 and 106 such that the two portions of light reflected from the FRMs efficiently interfere at each of the 3×3 coupler 104 ports. The optical coupler 104 introduces relative phase shifts of 0 degrees, +120 degrees and −120 degrees to the interference signal, such that first, second and third interference signal components are produced, each at a different relative phase.

First and second interference signal components are directed by the optical coupler 104 to photodetectors 113 and 114, which measure the intensity of the respective interference signal components.

The circulator 103 provides an efficient path for the input light and the returning (third) interference signal component through the same port of the coupler 104. The interference signal component incident on the optical circulator 103 is directed towards photodetector 115 to measure the intensity of the interference signal component.

The outputs of the photodetectors 113, 114 and 115 are combined to measure the relative phase of the incoming light, as described in more detail below with reference to FIGS. 7 and 9.

Optionally, frequency shifters 110 and 111 and/or optical modulator 109 may be used along the paths 105 and 106 for heterodyne signal processing. In addition, the frequency shift of 110 and 111 may be alternated from f1, f2 to f2, f1 respectively to reduce any frequency-dependent effect between the two portions of the light propagating through optical paths 105 and 106.

The above-described embodiment provides an apparatus suitable for fast quantitative measurement of perturbation of optical fields, and in particular can be used for distributed and multiplexed sensors with high sensitivity and fast response times to meet requirements of applications such as acoustic sensing.

Figure 7:
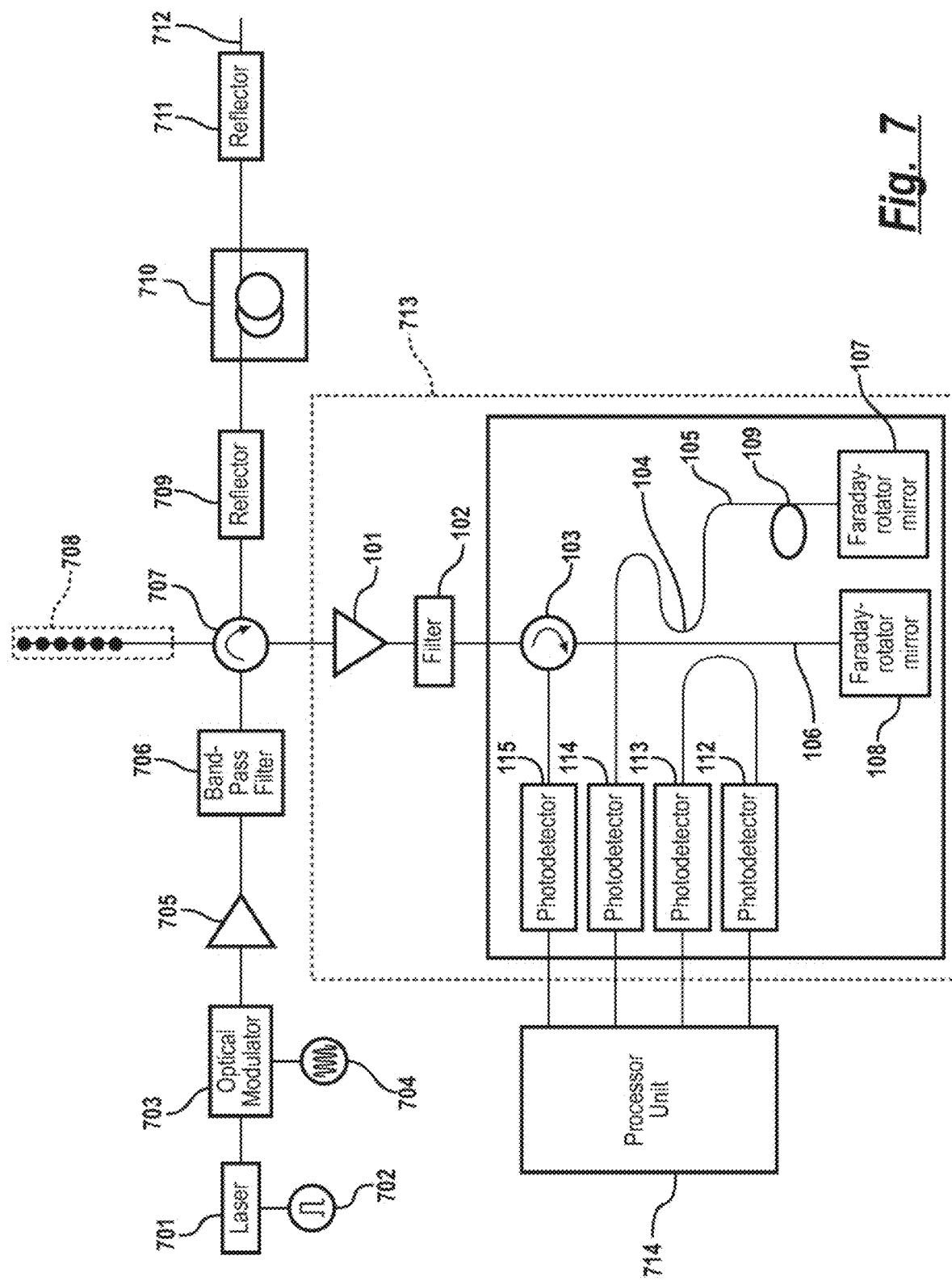
FIG. 7 shows schematically a sensor system that utilises an interferometer for fast measurement of scattered and reflected light from an optical fibre.

FIG. 7 shows an application of the interferometer of FIG. 1 to the distributed sensing of an optical signal from an optical system 700. It will be apparent that although the application is described in the context of distributed sensing, it could also be used for point sensing, for example by receiving reflected light from one or more point sensors coupled to the optical fibre.

In this embodiment 700, light emitted by a laser 701 is modulated by a pulse signal 702. An optical amplifier 705 is used to boost the pulsed laser light, and this is followed by a bandpass filter 706 to filter out the ASE noise of the amplifier. The optical signal is then sent to an optical circulator 707. An additional optical filter 708 may be used at one port of the circulator 707. The light is sent to sensing fibre 712, which is for example a single mode fibre or a multimode fibre deployed in an environment in which acoustic perturbations are desired to be monitored. A length of the fibre may be isolated and used as a reference section 710, for example in a "quiet" location. The reference section 710 may be formed between reflectors or a combination of beam splitters and reflectors 709 and 711.

The reflected and the backscattered light generated along the sensing fibre 712 is directed through the circulator 707 and into the interferometer 713. The detailed operation of the interferometer 713 is described earlier with reference to FIG. 1. In this case, the light is converted to electrical signals using fast low-noise photodetectors 112, 113, 114 and 115. The electrical signals are digitised and then the relative optical phase modulation along the reference fibre 710 and the sensing fibre 712 is computed using a fast processor unit 714 (as will be described below). The processor unit is time synchronised with the pulse signal 702. The path length difference (109) between path 105 and path 106 defines the spatial resolution. The photodetector outputs may be digitised for multiple samples over a given spatial resolution. The multiple samples are combined to improve the signal visibility and sensitivity by a weighted averaging algorithm combining the photodetector outputs.

It may be desirable to change the optical frequency of the light slightly to improve the sensitivity of the backscattered or reflected signals. The optical modulator 703 may be driven by a microwave frequency of around 10-40 GHz to generate optical carrier modulation sidebands. The optical filter 708 can be used to select the modulation sidebands which are shifted relative to the carrier. By changing the modulation frequency it is possible to rapidly modulate the selected optical frequency.

Data Processing

Figure 9:
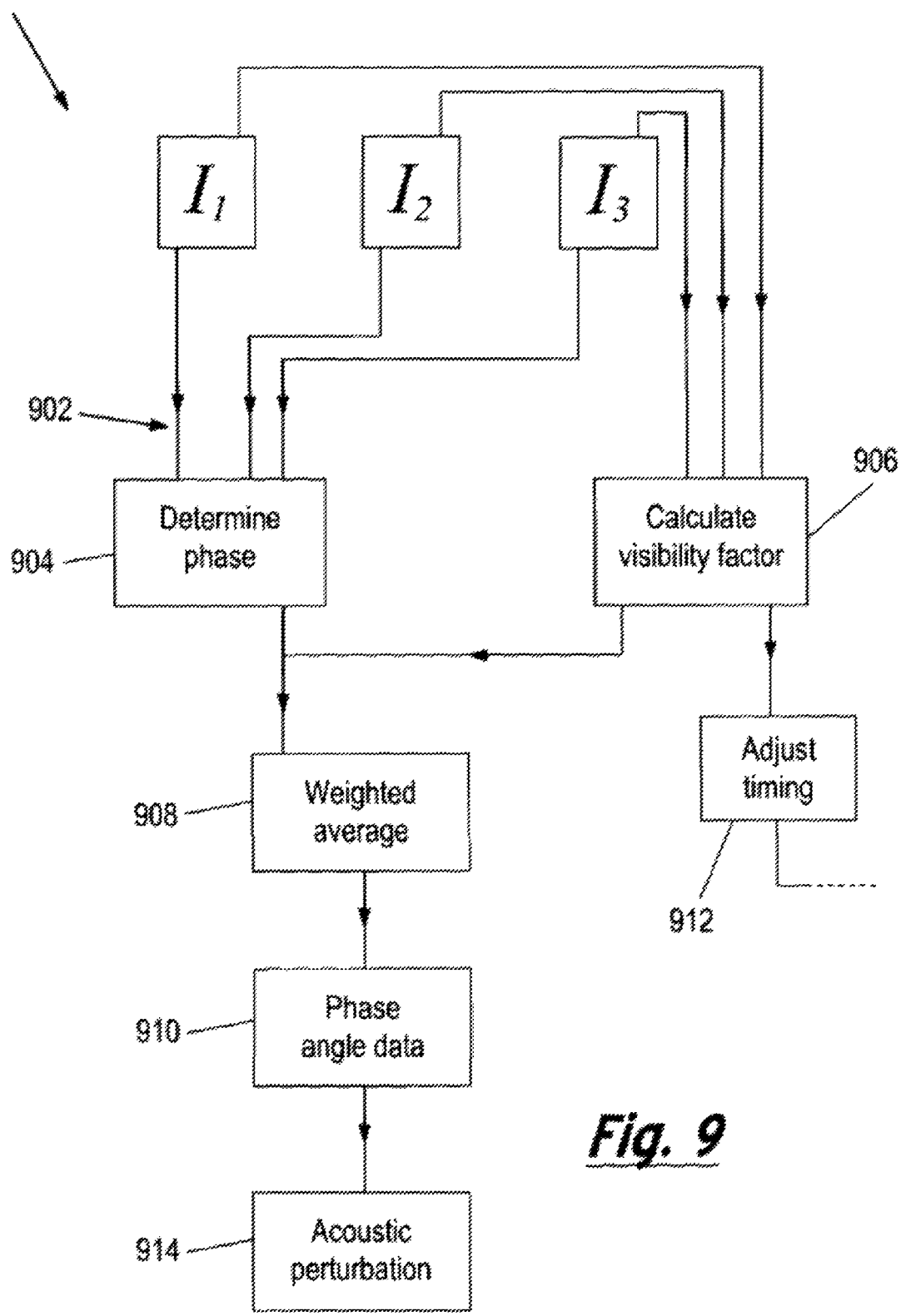
FIG. 9 is a block diagram representing a data processing method.
Figure 10:
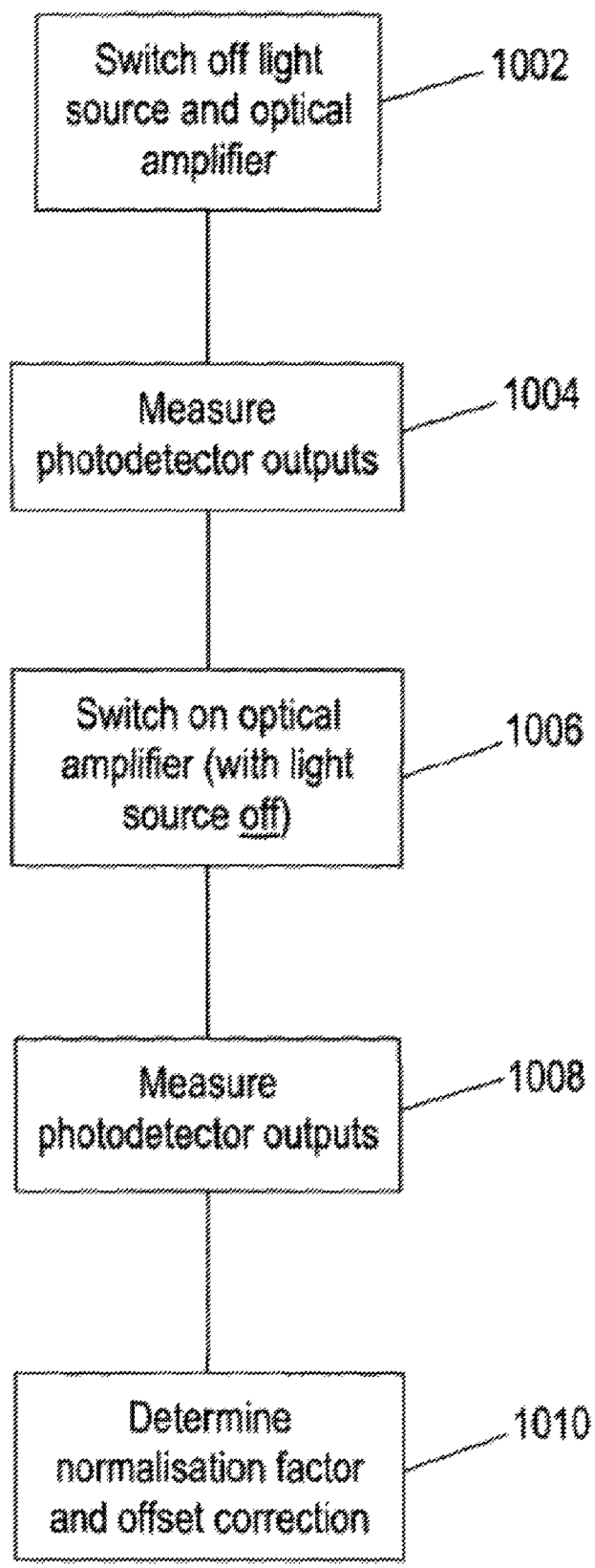
FIG. 10 is a block diagram representing a method of calibrating an interferometer.

FIG. 9 schematically represents a method 1100 by which the optical phase angle is determined from the outputs of the photodetectors 113, 114, 115. The path length difference between path 105 and path 106 defines the spatial resolution of the system. The photodetector outputs may be digitised for multiple samples over a given spatial resolution, i.e. the intensity values are oversampled. The multiple samples are combined to improve the signal visibility and sensitivity by a weighted averaging algorithm combining the photo-detector outputs.

The three intensity measurements $I_1$, $I_2$, $I_3$, from the photodetectors 113, 114, 115 are combined at step 1 102 to calculate the relative phase and amplitude of the reflected or backscattered light from the sensing fibre. The relative phase is calculated (step 1104) at each sampling point, and the method employs oversampling such that more data points are available than are needed for the required spatial resolution of the system.

Methods for calculating the relative phase and amplitude from three phase shifted components of an interference signal are known from the literature. For example, Zhiqiang Zhao et al. in "Improved Demodulation Scheme for Fiber Optic Interferometers Using an Asymmetric 3×3 Coupler", *J. Lightwave Technology*, Vol. 13, No. 11, November 1997, pp. 2059-2068 and also U.S. Pat. No. 5,946,429 describe techniques for demodulating the outputs of 3×3 couplers in continuous wave multiplexing applications. The described techniques can be applied to the time series data of the present embodiment.

For each sampling point, a visibility factor V is calculated at step 1106 from the three intensity measurements $I_1$, $I_2$, $I_3$, from the photodetectors 113, 114, 115, according to equation (1), for each pulse.

$$V=(I_1-I_2)^2+(I_2-I_3)^2+(I_3-I_1)^2 \quad \text{Equation (1)}$$

At a point of low visibility, the intensity values at respective phase shifts are similar, and therefore the value of V is low. Characterising the sampling point according the V allows a weighted average of the phase angle to be determined (step 1108), weighted towards the sampling points with good visibility. This methodology improves the quality of the phase angle data 1110.

Optionally, the visibility factor V may also be used to adjust (step 1112) the timing of the digital sampling of the light for the maximum signal sensitivity positions. Such embodiments include a digitiser with dynamically varying clock cycles, (which may be referred to herein as "iclock"). The dynamically varying clock may be used to adjust the timing of the digitised samples at the photodetector outputs for the position of maximum signal sensitivity and or shifted away from positions where light signal fading occurs.

The phase angle data is sensitive to acoustic perturbations experienced by the sensing fibre. As the acoustic wave passes through the optical fibre, it causes the glass structure to contract and expand. This varies the optical path length between the backscattered light reflected from two locations in the fibre (i.e. the light propagating down the two paths in the interferometer), which is measured in the interferometer as a relative phase change. In this way, the optical phase angle data can be processed at 1114 to measure the acoustic signal at the point at which the light is generated.

In preferred embodiments of the invention, the data processing method 1100 is performed utilising a dedicated processor such as a Field Programmable Gate Array.

Sensor Calibration

For accurate phase measurement, it is important to measure the offset signals and the relative gains of the photodetectors 113,114 and 115. These can be measured and corrected for by method 1200, described with reference to FIG. 10.

Each photodetector has electrical offset of the photodetectors, i.e. the voltage output of the photodetector when no light is incident on the photodetector (which may be referred to as a "zero-light level" offset. As a first step (at 1202) switching off the incoming light from the optical fibre and the optical amplifier 101. When switched off, the optical amplifier 101 acts as an efficient attenuator, allowing no significant light to reach the photodetectors. The outputs of the photodetectors are measured (step 1204) in this condition to determine the electrical offset, which forms a base level for the calibration.

The relative gains of the photodetectors can be measured, at step 1208, after switching on the optical amplifier 101 while the input light is switched off (step 1206). The in-band spontaneous emission (i.e. the Amplified Spontaneous Emission which falls within the band of the bandpass filter 102), which behaves as an incoherent light source, can then be used to determine normalisation and offset corrections (step 1210) to calibrate the combination of the coupling efficiency between the interferometer arms and the trans-impedance gains of the photodetectors 113, 114 and 115. This signal can also be used to measure the signal offset, which is caused by the in-band spontaneous emission.

Conveniently, the optical amplifier, which is a component of the interferometer, is used as in incoherent light source without a requirement for an auxiliary source. The incoherence of the source is necessary to avoid interference effects at the photodetectors, i.e. the coherence length of the light should be shorter than the optical path length of the interferometer. However, for accurate calibration it is preferable for the frequency band of the source to be close to, or centred around, the frequency of light from the light source. The bandpass filter 102 is therefore selected to filter out light with frequencies outside of the desired bandwidth from the Amplified Spontaneous Emission.

When used in a pulsed system, such as may be used in a distributed sensor, the above-described method can be used between optical pulses from the light source, to effectively calibrate the system during use, before each (or selected) pulses from the light source with substantively no interruption to the measurement process.

Figure 2:
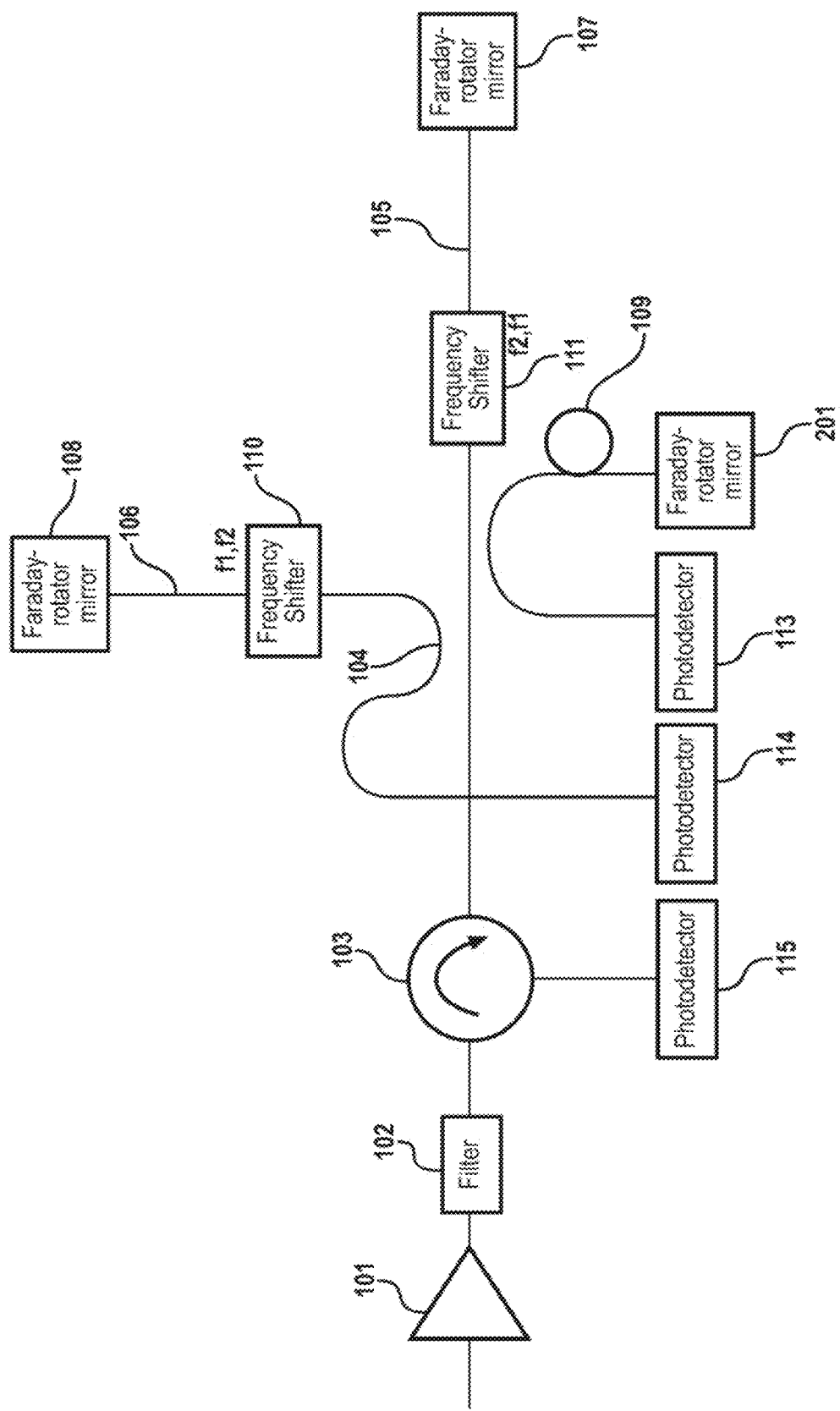

Variations to the above-described embodiments are within the scope of the invention, and some alternative embodiments are described below. FIG. 2 shows another embodiment, generally depicted at 200, of a novel interferometer similar to that shown in FIG. 1 but with an additional Faraday-rotator mirror 201 instead of photodetector 112. Like components are indicated by like reference numerals. In this case the interference between different paths, which may have different path length, can be separated at the three beat frequencies $f_1$, $f_2$ and $(f_2-f_1)$. The arrangement of this embodiment has the advantage of providing additional flexibility in operation, for example the different heterodyne frequencies can provide different modes of operation to generate measurements at different spatial resolutions.

Figure 3:
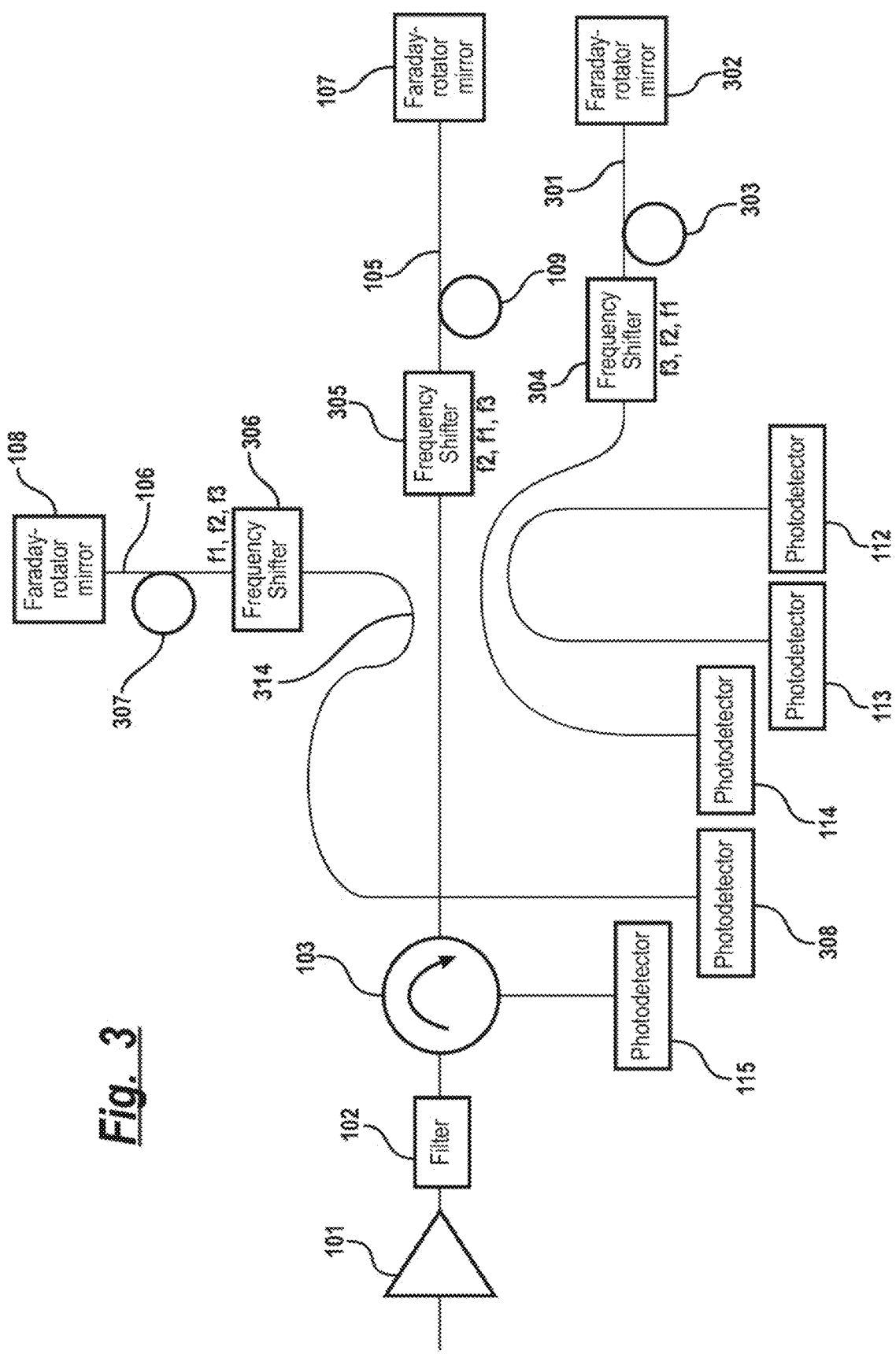

FIG. 3 shows another embodiment of a novel interferometer, generally depicted at 300, similar to the arrangement of FIG. 1, with like components indicated by like reference numerals. However, this embodiment uses a 4×4 coupler 314 and an additional optical path 301, frequency shifter 304, phase modulator 303, Faraday-rotator minor 302 and additional photo-detector 308. Additionally, the first optical path 105 includes a frequency shifter 305 and the second optical path 106 includes a frequency shifter 306 and phase modulator 307. In this case the interference between different paths, which may have different path length differences, can be separated at the three beat frequencies (f24 1), (f3–f2) and (f3–f1). Alternatively, the Faraday-rotator minor 302 may be replaced by an isolator or a fibre matched end so that no light is reflected through path 301, so only allowing interference between path 105 and 106.

The 4×4 optical coupler of this arrangement generates four interference signal components at relative phase shifts of −90 degrees, 0 degrees, 90 degrees, 180 degrees.

Figure 4:
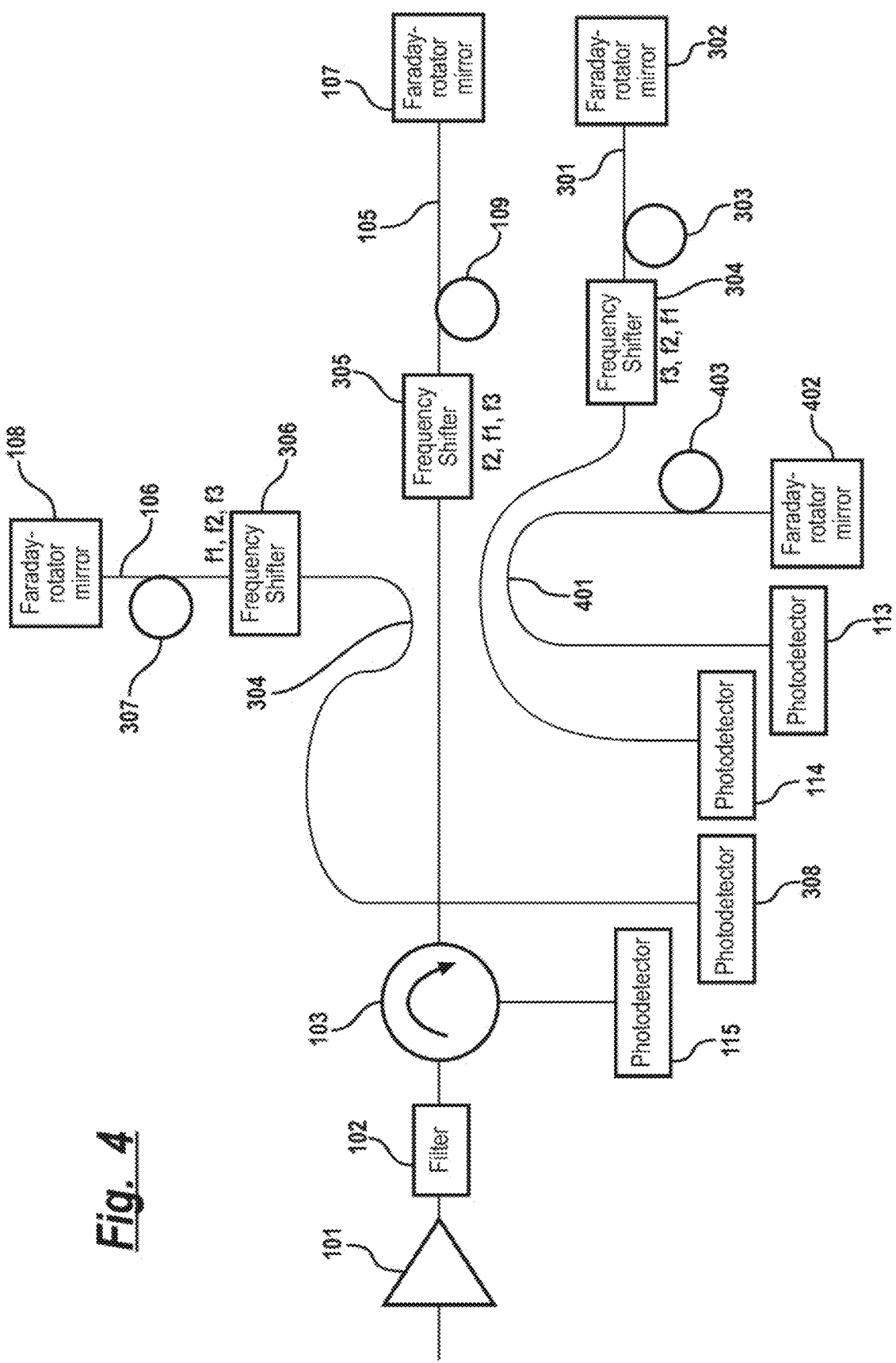

FIG. 4 shows another embodiment of the interferometer. In this case an additional path is introduced in the interferometer by inserting a Faraday-rotator minor 402 instead of the photo-detector 112.

In all of the above-described embodiments, optical switches may be used to change and/or select different combinations of optical path lengths through the interferometer. This facilitates switching between different spatial resolutions measurements (corresponding to the selected path length differences in the optical path lengths).

Figure 5:
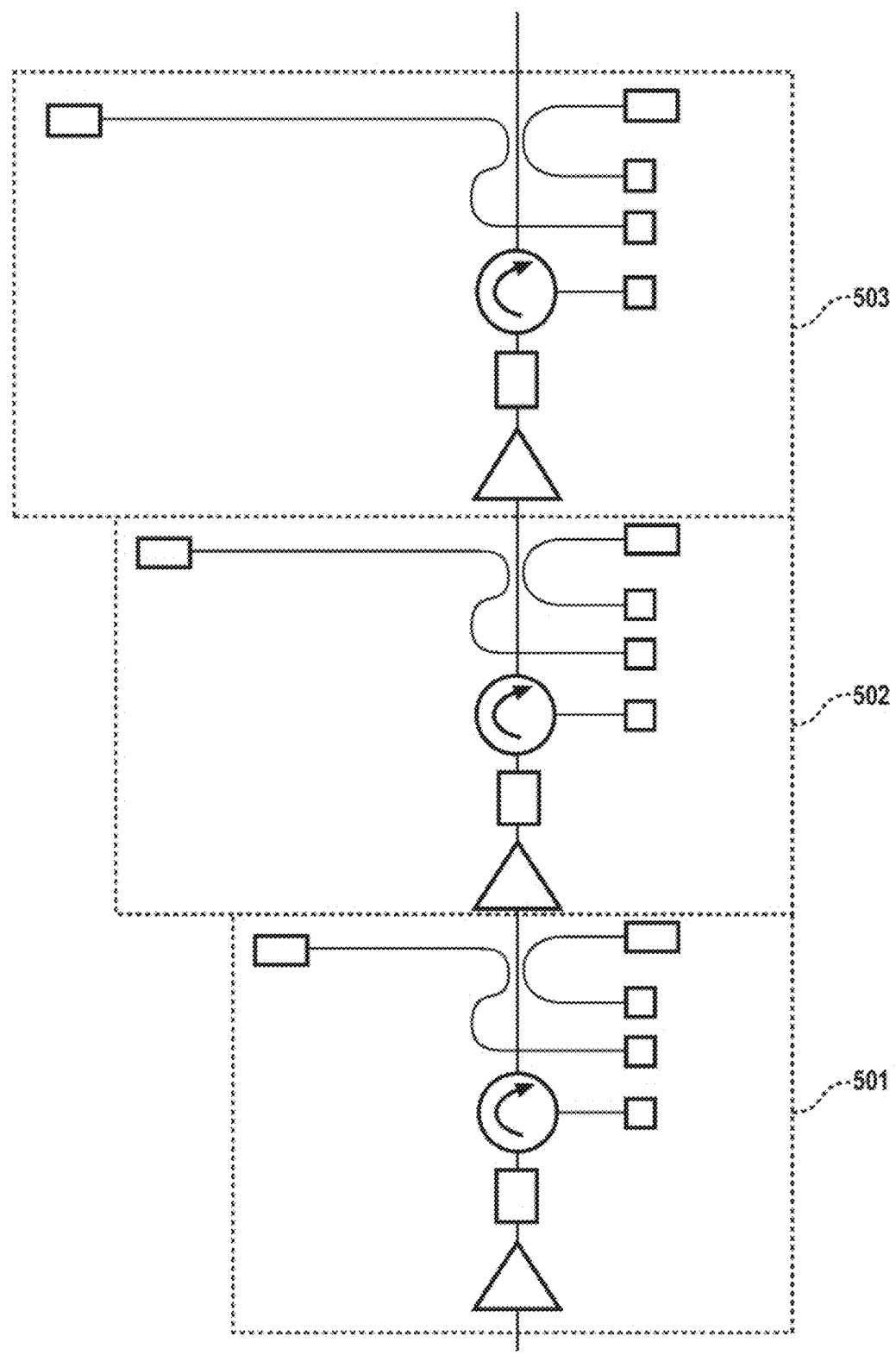
FIGS. 5 and 6 show schematically how the interferometers can be cascaded according to embodiments of the invention in series and/or star configurations.
Figure 6:
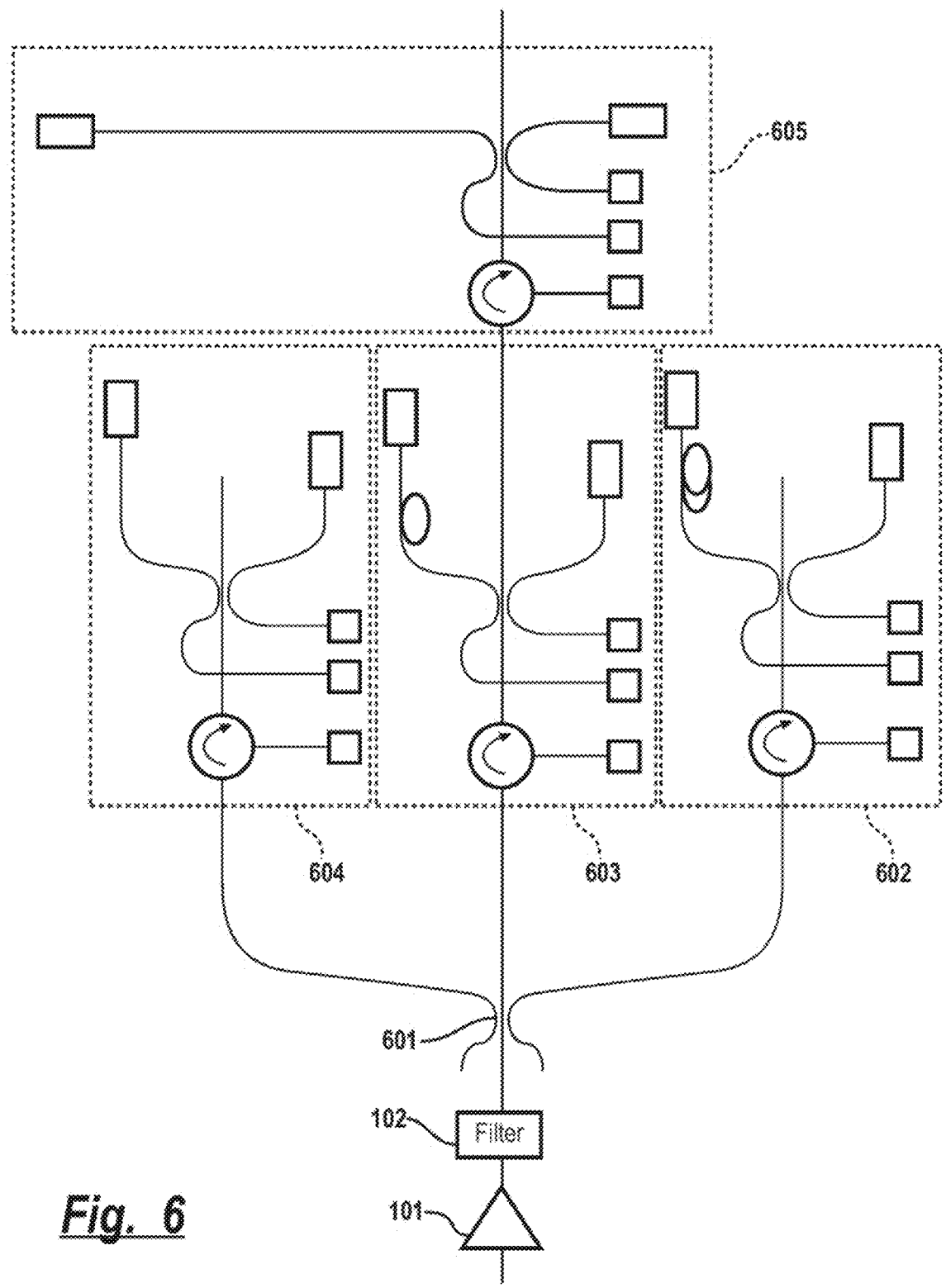

FIGS. 5 and 6 show examples of interferometer systems 500, 600 arranged for used in cascaded or star configurations to allow the measuring of the relative optical phase for different path length differences. In FIG. 5, three interferometers 501, 502, 503 having different path length differences (and therefore different spatial resolutions) are combined in series. In FIG. 6, four interferometers 602, 603, 604 and 605 having different path length differences (and therefore different spatial resolutions) are combined with interferometers 602, 603, 604 in parallel, and interferometers 603 and 605 in series. In FIG. 6, 601 is a 3×3 coupler, used to split the light between the interferometers. Arrangement 600 can also be combined with wavelength division multiplexing components to provide parallel outputs for different optical wavelengths.

The embodiments described above relate to apparatus and methods for fast quantitative measurement of acoustic perturbations of optical fields transmitted, reflected and or scattered along a length of an optical fibre. Embodiments of the invention can be applied or implemented in other ways, for example to monitor an optical signal generated by a laser, and/or to monitor the performance of a heterodyne signal generator, and to generate optical pulses for transmission into an optical signal. An example is described with reference to FIG. 8.

Figure 8:
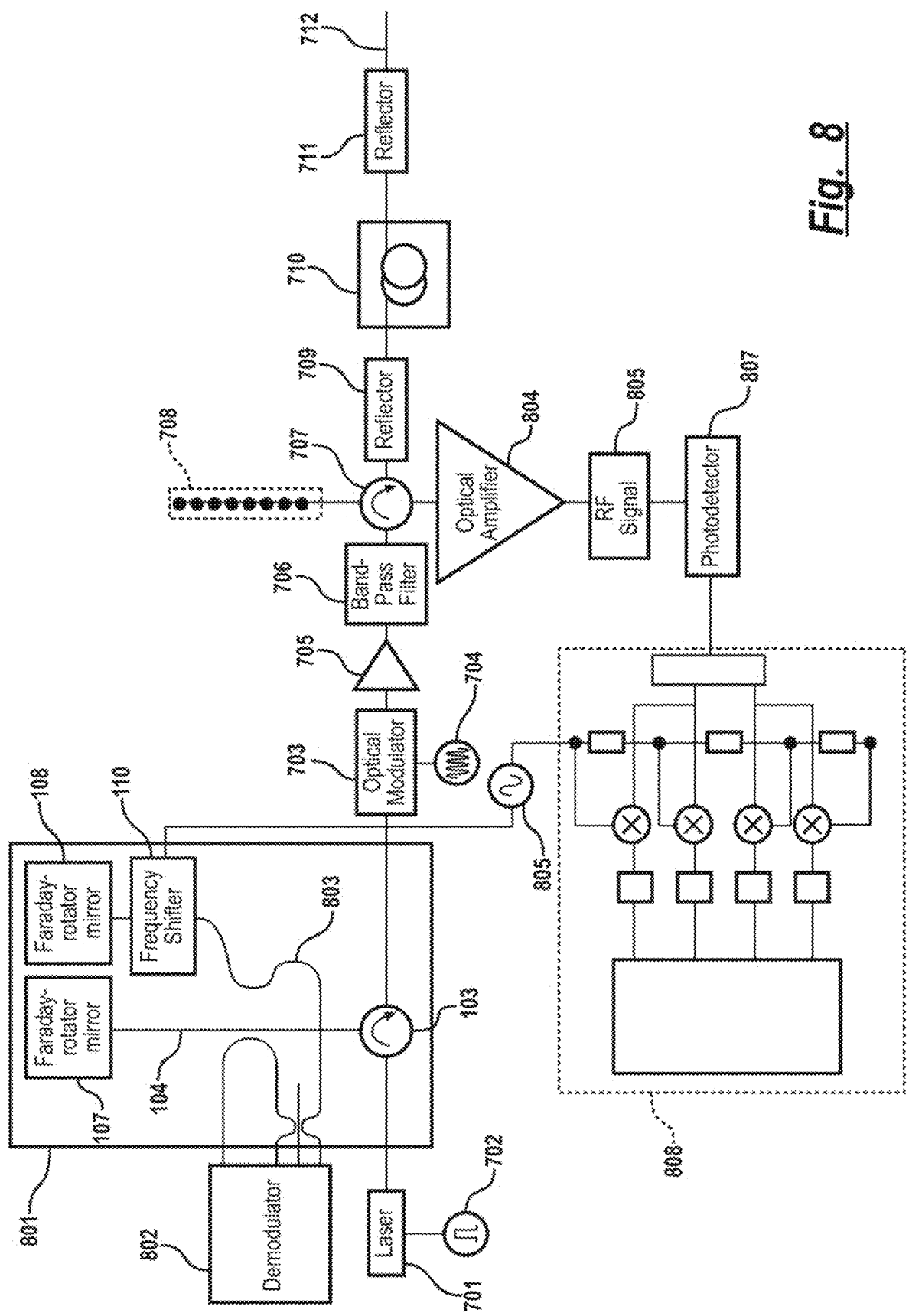
FIG. 8 shows schematically a distributed sensor system that utilises an interferometer to generate a series of pulses each of different frequency and thereby allowing a different portion of the scattered light to interfere with another portion of the scattered light with a slight frequency shift resulting in a heterodyne beat signal.

FIG. 8 shows a system, generally depicted at 800, comprising an interferometer 801 in accordance with an embodiment of the invention, used to generate two optical pulses with one frequency-shifted relative to the other. The interferometer receives an input pulse from a laser 701, via optical circulator 103. A 3×3 optical coupler 104 directs a component of the input pulse to a photodetector, and components to the arms of the interferometer. One of the arms includes a frequency shifter 1 10 and an RF signal 805. The interference between the two pulses is monitored by a demodulator 802. The light reflected by Faraday-rotator mirrors 107 and 108 is combined at the coupler 809 using a delay 803 to match the path length of the interferometer, so that the frequency shifted pulse and the input pulse are superimposed. The coupler 809 introduces relative phase shifts to the interference signal, and interferometer therefore monitors three heterodyne frequency signal components at relative phase shifts. The optical circulator 103 passes the two pulses into the sensing fibre.

In this embodiment, the reflected and backscattered light is not detected by an interferometer according to the invention. Rather, the reflected and backscattered light is passed through an optical amplifier 804 and an optical filter 806 and are then sent to a fast, low-noise photodetector 807. The electrical signal is split and then down-converted to baseband signals by mixing the RF signal 805 at different phase angles, in a manner known in the art. The electrical signals are digitised and the relative optical phase modulation at each section of the fibre is computed by combining the digitised signals using a fast processor 808.

Figure 11:
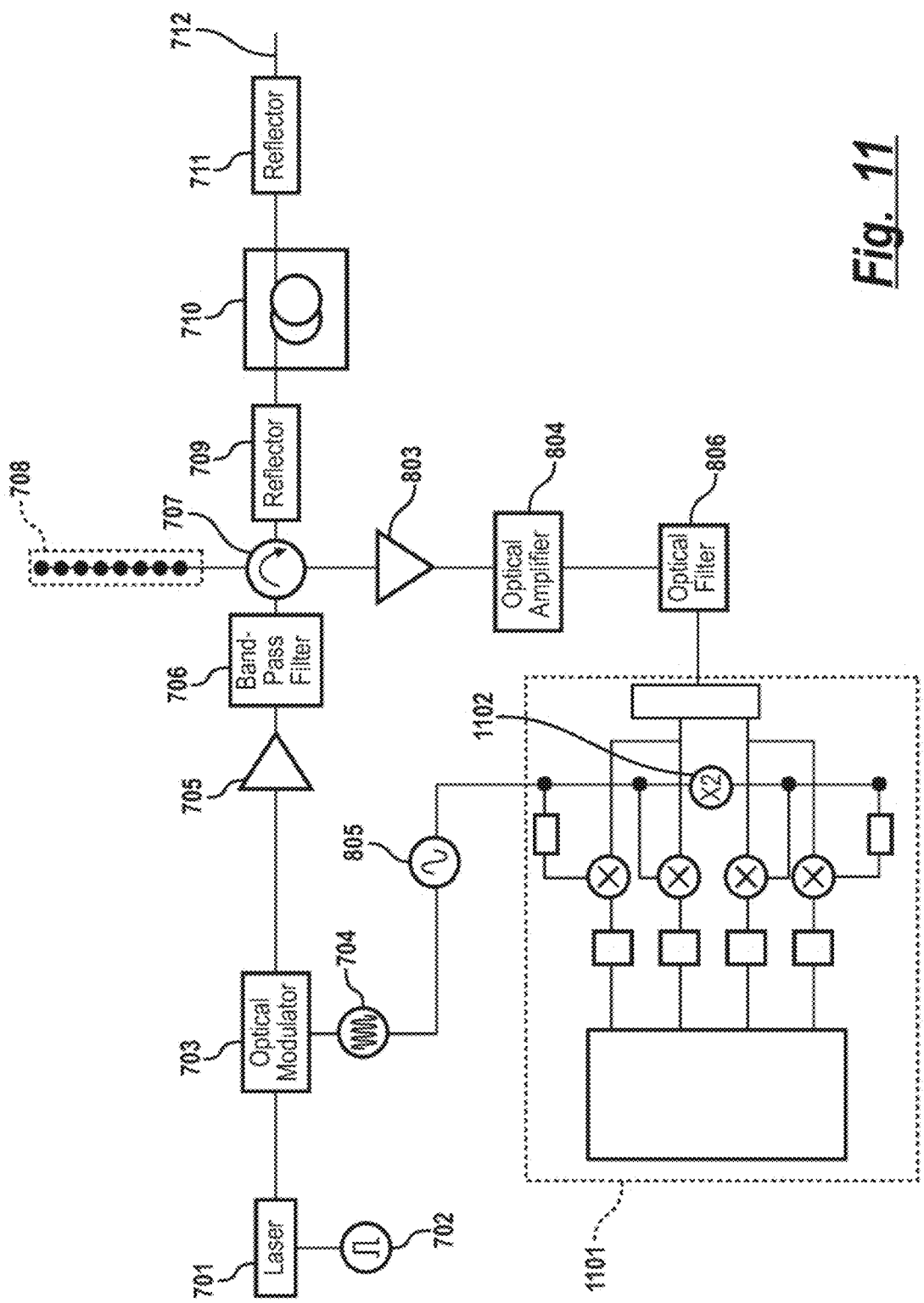
FIG. 11 shows schematically a distributed sensor system where the spectrum of the light that is modulated using a fast optical modulator, that generators multiple frequency side bands with part of spectrum being selected using an optical filter.

FIG. 11 shows another embodiment of apparatus for point as well as distributed sensors. In this case the modulation frequency 704 of the optical modulator 703 is switched from f1 to f2 within the optical pulse modulation envelope.

The optical filter 708 selects two modulation frequency sidebands 1202/1203 and 1204/1205 generated by the optical modulator as indicated in FIG. 12. The frequency shift between first order sidebands 1202 and 1203 is proportional to the frequency modulation difference (f2−f1) whereas the frequency shift between $2^{nd}$ order sidebands 1204 and 1205 is proportional to 2(f2−f1). Therefore, the photo-detector output 806 generates two beat signals, one of which is centred at (f2−f1) and the other at 2(f2−f1). Using the demodulator 901, the relative optical phase of the beat signals can be measured independently. The two independent measurements can be combined to improve the signal visibility, the sensitivity and the dynamic range along the sensing fibre.

Figure 12A:
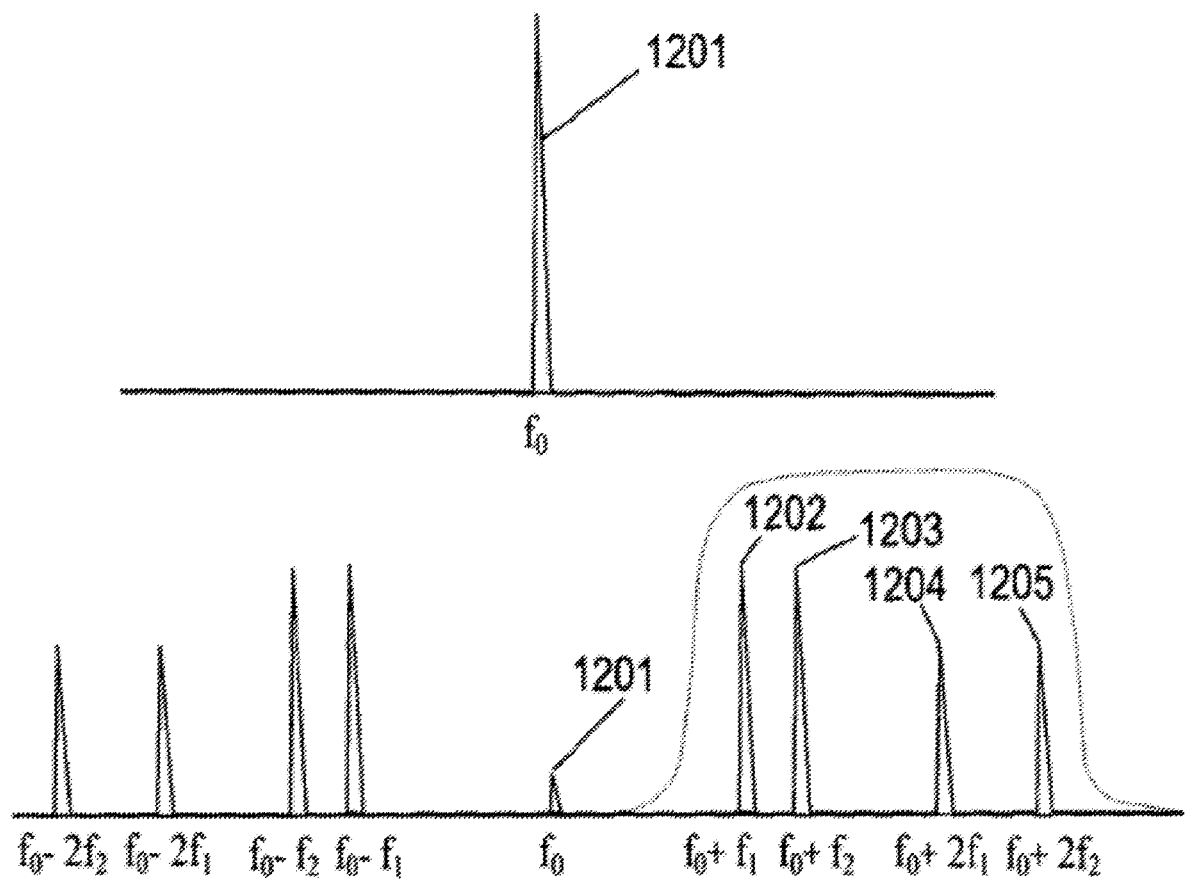
FIG. 12A shows the spectrum of the light modulated and selected using the optical filter for the arrangement shown in FIG. 11.

FIG. 12A shows the modulation spectrum of the light and the selection of the sidebands referred to above.

Figure 12B:
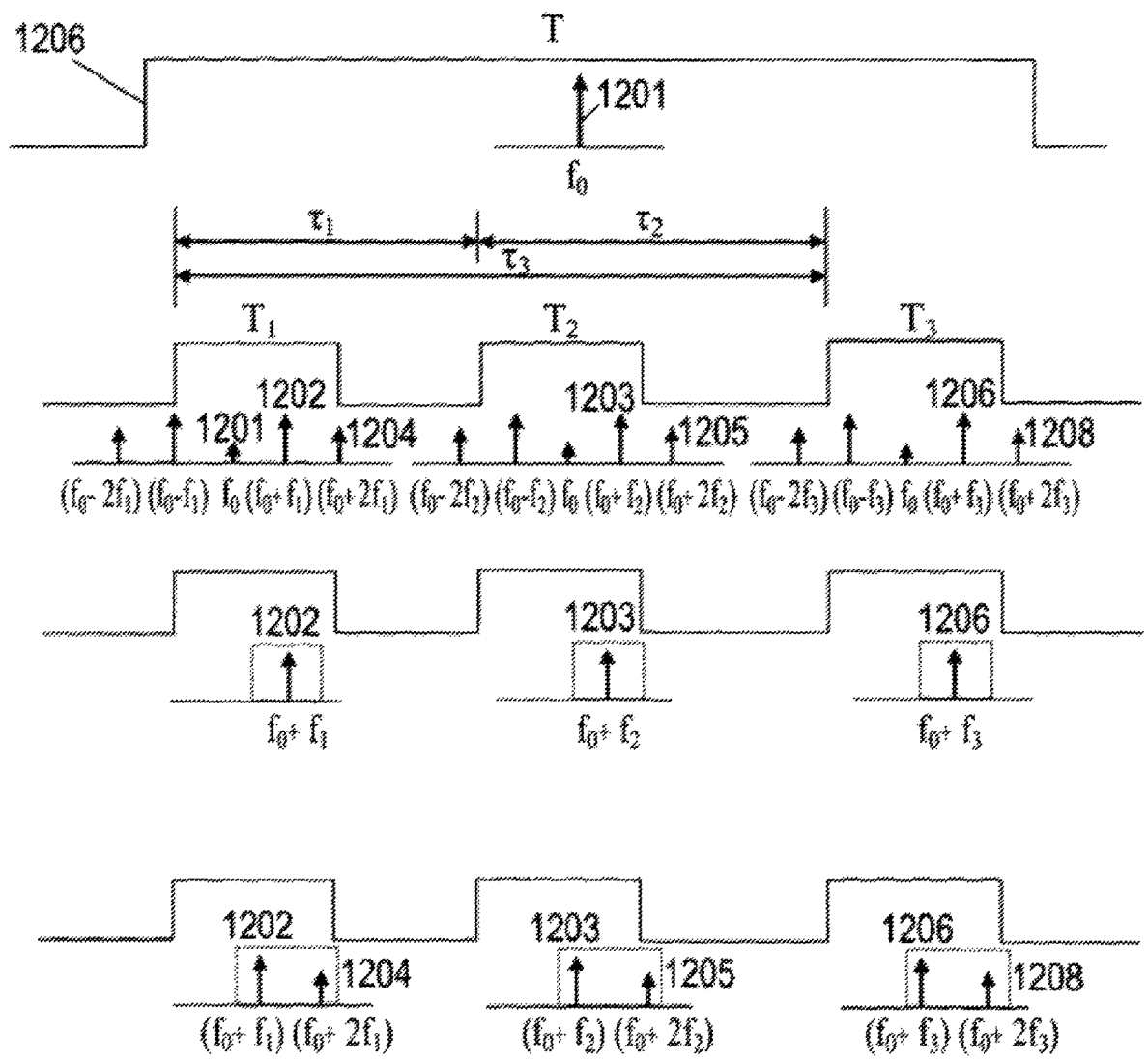
FIG. 12B shows schematically a timing diagram for a method in accordance with FIG. 11.
Figures 1, 13:
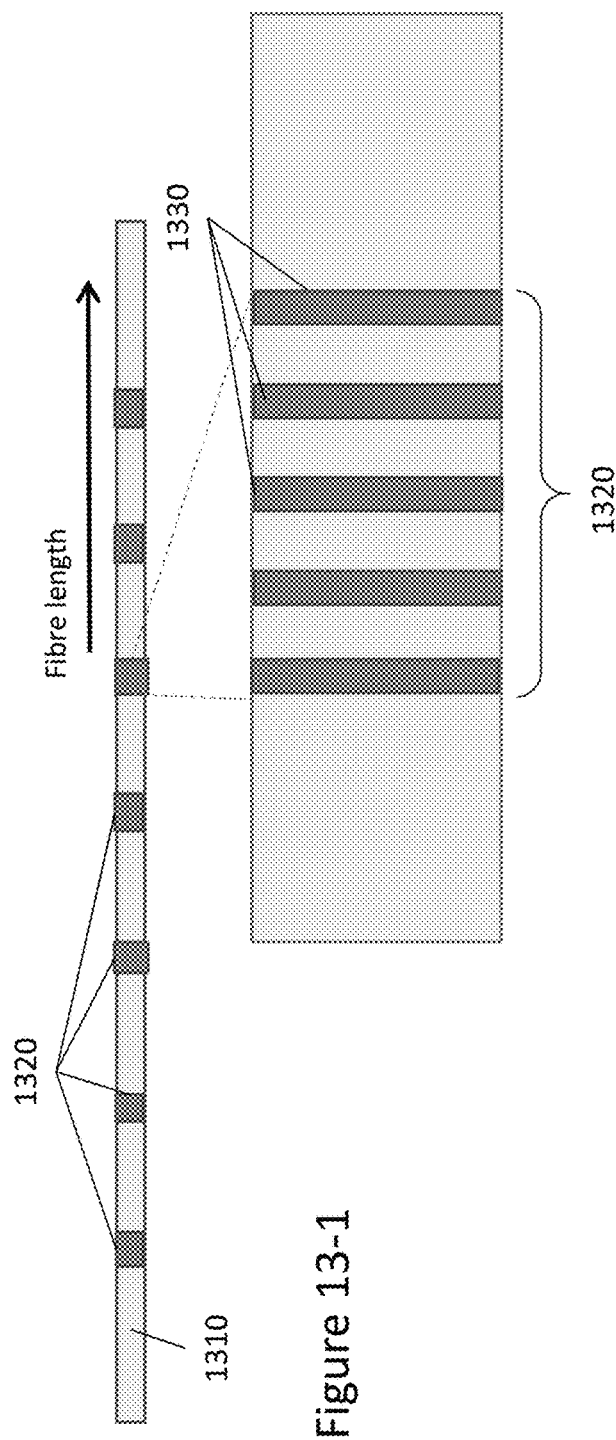

FIG. 12B shows the original laser pulse 1206 with pulse width of T at frequency $f_o$ which is modulated at frequency f1, f2 and f3 during a period T1, T2 and T3, respectively. The delay between T1, T2 and T3 can also be varied. One or more modulation sidebands is/are selected with the optical filter 708 to generated a frequency shifted optical pulses that are sent into the fibre. The reflected and/or backscatter signals (709, 710, 711 and 712) from the fibre from is directed to a photodetector receive via a circulator 707. The reflected and or backscatter light from different pulses mix together at the photodetector output to generate heterodyne signals such (f2−f1), (f3−f1), (f3−f2), 2(f2−f1), 2(f3−f1) and 2(f3-f2). Other heterodyne signals are also generated but (2f2−f1), (2f3−f1), (2f1−f2), (2f1−f3), (2f3−f1) and (2f3−f2) are also generated at much higher frequencies. The heterodyne signal are converted down to base band in-phase and quadrature signals. The in-phase and quadrature signals are digitise by a fast analogue to digital converters and the phase angle is computed using fast digital signal processor.

As noted, the above described embodiments correspond to those already published in our previous International patent application no WO 2010/136810, and relate to various versions of an optical fiber distributed acoustic sensor that form the basis for embodiments of the present invention. As previously explained in the overview section above, embodiments of the present invention make use of any of the previously published arrangements with a modified fiber that includes specific reflection points along its length, spaced in dependence on the intended spatial resolution (strictly speaking to the gauge length) of the DAS, and also optionally with some additional signal processing enhancements, to significantly increase the sensitivity of the overall optical fiber sensing system thus obtained. Further details are given next.

The performance of a fiber optic distributed acoustic sensor (DAS), for most applications, is limited by the system's acoustic signal to noise ratio (SNR). Improving the acoustic SNR can lead to, for example, quantification of flow, seismic and leak signals which are otherwise unmeasurable. The acoustic SNR of a DAS in turn depends upon the DAS optical SNR, which is the relationship of the magnitude of the optical signal and the associated detection noise. The optical SNR, and so the acoustic SNR, is optimised by maximising the amount of optical signal returning from the optical fibre.

The returning optical signal can be maximised using a number of techniques, including using a shorter wavelength source light (shorter wavelengths scatter more) and using a fibre with a large scattering coefficient or a large capture angle. Herein we describe a technique using introduced reflection points at pre-determined positions in the fibre. These reflection points should have the functionality of partially-reflective mirrors—ideally they should reflect a small amount of light (typically less than 0.1%) across a relatively large bandwidth (e.g. of the order of >2 nm) and transmit the remainder. Even with such a small reflectivity, the amplitude of reflected light will still be more than an order of magnitude larger than that of the naturally backscattered light over the same spatial interval. The use of reflectors therefore has an advantage over other techniques, such as using a higher scattering coefficient, in that all of the light lost from the transmission is reflected back towards the DAS rather than scattered in all directions.

As well as increasing the optical signal, the use of reflection points gives another significant benefit to the DAS noise characteristics. This is because, when using standard fibres, a DAS is typically subject to 1/f noise, meaning that the acoustic noise for low frequencies (particularly below 10 Hz) is significantly higher than the noise at higher frequencies. The existence of 1/f noise is fundamental to the random nature of backscattering characteristics and dominates the DAS performance for low frequency measurements, which constitute a major part of the DAS applications. When using reflection points, however, reflection characteristics are fixed, rather than random, and this has the effect of reducing the 1/f noise to an unmeasurable level. The controlled scattering also results in a uniform noise floor, both spatially and temporally, whereas random scattering inherent produces a noise floor characteristic which typically varies rapidly in distance and slowly in time. In addition, the fixed reflection characteristics result in a more stable measured acoustic amplitude than is achieved using backscattering.

In an ideal embodiment each reflection point along the fiber would be a weak mirror—that is a reflection point would reflect all wavelengths of light equally, with a constant reflection coefficient. Typically, the reflection coefficient would be around 0.01% (which is around 100× more light than is backscattered per metre of fibre), meaning that each mirror reflects 0.01% and transmits 99.99% of the incident light. However, a range of reflection coefficients would be acceptable, for example ranging for example from 0.002% to 0.1%, depending on design considerations. Generally, a smaller reflection coefficient will lead to less light reflected, and hence a smaller performance improvement, but will allow for greater theoretical range, whereas a higher reflection coefficient will reflect more light and hence provide greater signal to noise ratio, but may impact the sensing range along the fiber, particularly for finer spatial resolutions where the reflection points are closer together. Where a reflection coefficient of 0.01% is used, then due to the low loss at each reflection point, it is practical to insert many 100 s of such weak mirrors into the fibre without introducing significant optical losses. For example, 1000 reflection points would introduce an excess loss of just 0.4 dB (equivalent to the loss of 2 km of standard optical fibre).

The reflection points are typically spaced at the same distance as the spatial resolution ("gauge length") of the DAS. This means that, if the DAS spatial sensing resolution is 10 m, 1000 reflection points can be used to make up a total sensing length of 10 km. In some embodiments the DAS needs no modification to make it compatible with the fibre containing the reflection points—conceptually, the DAS treats the new fibre the same as standard fibre (albeit with a higher scattering coefficient). In other embodiments, however, the DAS signal processing can be optimised for use with this fibre by making use of the fact that now all sensing positions between each pair of reflection points measure the same signal. This means, for example, we can measure many positions between reflection points and then average the signals from these positions to improve the SNR.

In addition, the increased signal to noise ratio can be used to significantly improve the spatial resolution of the DAS while still maintaining an acceptable noise performance. For example, whereas a DAS using backscatter requires a gauge length of around 1 m to achieve an acceptable SNR for most applications, using reflectors, an acceptable SNR can be achieved with a gauge length of around 5 cm. Such an improvement in spatial resolution allows the accurate measurement of ultrasonic signals and, for example, the tracking of features associated with short length scales, such as eddies in pipes. It may be necessary to use a phase correlation arrangement with a narrow detection bandwidth to achieve sufficient signal-to-noise performance. There can also be advantages in long range applications such as leak detection, pipelines and subsea.

Another feature is to measure very small temperature variations along a section of a pipe caused by fluid flow down to less than m° K. and up to few Hertz. The high resolution temperature measurement can be used to measure the fluid flow by observing the propagation of the exchange of the turbulent thermal energy.

Note, as the DAS configuration may be identical for measuring on either standard fibre or fibres with reflection points it is possible to perform a hybrid measurement, where the DAS simultaneously measures on both fibre types. Here, for example, the reflection points could be positioned at strategic positions where more sensitivity is required (for example to measure flow) whereas the rest of the fibre, which is unmodified, is used for measurements, such as seismic, where more coverage and less sensitivity is required.

Although as noted above the ideal reflection point would be a weak mirror—that is that it would reflect all wavelengths of light equally, with a constant reflection coefficient—the most suitable current technology to form the reflection point is the Fibre Bragg Grating (FBG). A FBG is usually designed as either an optical filter or as a sensing element where the peak reflection wavelength of the grating is used to determine the grating spacing and hence the strain or temperature of the FBG. FBGs can be written into an optical fiber using femtosecond laser writing processes. In particular, FBGs can now be written directly into an optical fibre as the fibre is drawn, and before the fibre is coated, making it commercially and technically practicable to produce a fibre with 1000 s of FBGs. Additionally, FBGs can be embedded into an optical fiber by changing its refractive index using femtosecond laser writing processes or written by UV laser during fiber drawing.

One drawback with commercial FBGs is that they are generally designed to maximise peak reflection, and to selectively reflect a particular wavelength (which may change with temperature or strain). In the present embodiments, on the other hand, we want the opposite characteristics—a low level of reflection over a broad wavelength range such that our laser light is constantly reflected as the temperature of the FBG changes (for example as the cable is deployed down an oil well).

Figures 1, 14:
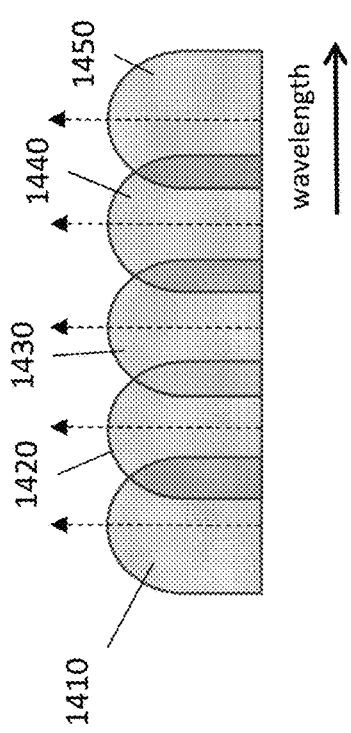

In order to address this issue in the prototype embodiments we have tested to date, the change in peak reflection wavelength with temperature is dealt with by using five overlapping (in wavelength) FBGs at each reflection point. Each FBG in this example is around 1 mm in length, with a separation of 10 mm between FBGs, meaning the total length of each reflection point is around 45 mm. The overall reflection bandwidth is around +/−2 nm. It was found though that this configuration is not ideal. This is because the overlap (in wavelength) of the gratings required to ensure we get reflection over the whole bandwidth leads to interference between the FBGs at each reflection point when the DAS laser is in the overlapping range (see FIG. 14). For this reason, in other embodiments we propose to change the FBG design to either of:

A single broadband grating. Generally, a broadband grating is also a weak grating, which is good in this application where a weak reflection and large transmission is desired. Generally, an optimum FBG for this application is what the industry would usually think of as a "bad grating", in that research is geared towards narrowing bandwidth and increasing the reflectivity. In contrast, our ideal grating may provide weak, broadband reflectivity, and be written into the fiber using femtosecond laser writing techniques.

A "chirped" grating. This has a varying reflection wavelength along the length of the grating. This allows broadband reflectivity without the interference issues we experience. In this case, again a weak reflectance is all that is required, across the reflection bandwidth.

Crosstalk

The use of reflection points introduces crosstalk caused by multiple reflections between the reflection points. These multiple paths will lead to an ambiguity in the location of a proportion of the optical signal (crosstalk). Our modelling suggests that this will not be a major issue for our target applications, provided the sum of the reflectivities of the reflection points does not exceed ~10%. For example, this condition allows the equivalent of 1000 reflection points each with a reflectivity of 0.01%.

Figure 15:
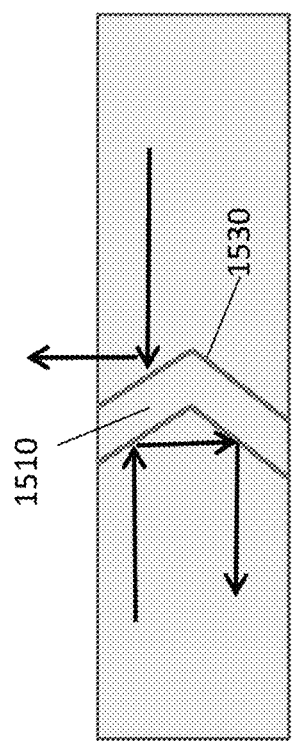
FIG. 15 is a diagram of an alternative reflecting structure.
Figure 16:
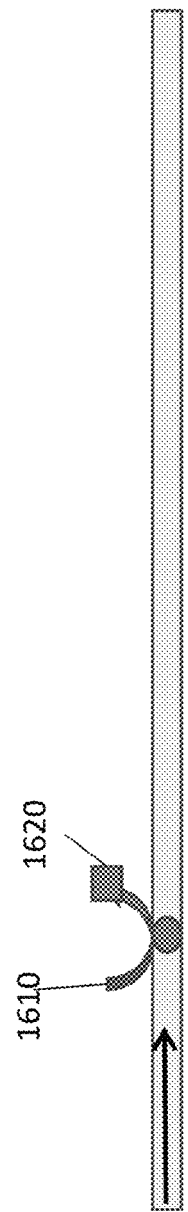
FIG. 16 is a diagram of another alternative reflecting structure.

If needed, novel architectures may be used to reduce the crosstalk, for example by using angled gratings, such as shown in FIG. 15 or by using a combination of couplers and mirrors, such as shown in FIG. 16. In more detail, FIG. 15 illustrates the use of an angled grating 1510 extending across the fiber. The grating includes a right-angled elbow section 1530, that is arranged such that it receives light passing along the fiber from a first direction, and reflects it back in the opposite direction, via two substantially 90 degree reflections from the grating. That is, the light from the first direction is incident on the "inside" edge of the elbow, such that it is then reflected back in the direction it came.

Conversely, light passing along the fiber from a second direction, opposite to the first direction, is incident on the "outside" edge of the elbow, such that it then reflects off the outside edge at 90 degrees to its original direction, and is then scattered out of the fiber. Such an arrangement should reduce cross-talk by preventing multiple reflections between different nearby gratings.

Another technique to reduce crosstalk is to increase the reflectivity over distance. This works because the nearer markers contribute most to the crosstalk. Such an arrangement also has the advantage that the reflectivity profile can be chosen to compensate for loss in the fibre, so giving an equal SNR along the fibre length.

FIG. 16 illustrates an alternative arrangement where a coupler component is used to couple a small proportion of the light into another fiber, that is then coupled to a mirror. Here, preferably the mirror is fully 100% reflective, and the coupling coefficient of the coupler is controlled so as to couple only a small amount (e.g. 0.01%, or some such value, as discussed above) of the incident light towards the mirror, so that the same overall weak reflection that is desired as described above is obtained.

Figure 17:
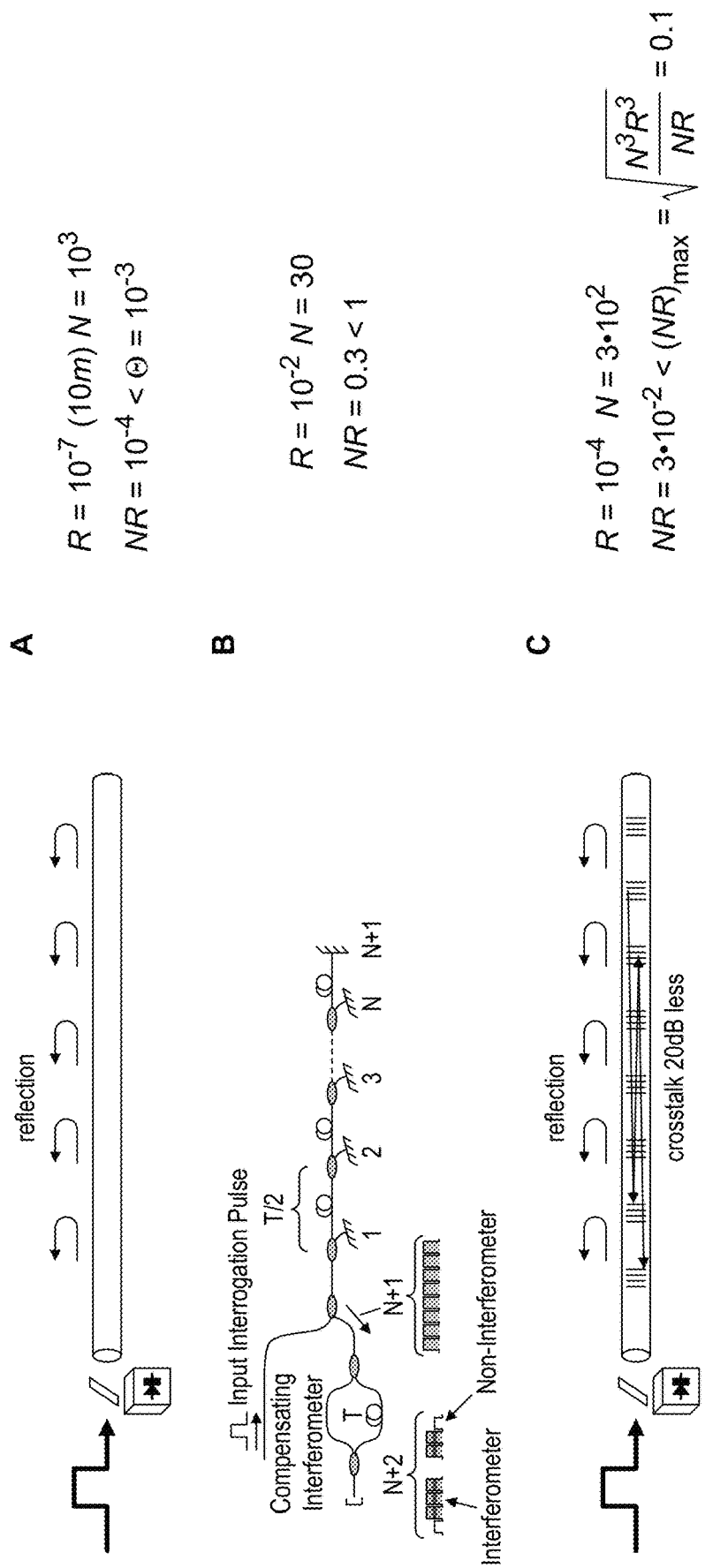
FIGS. 17 and 18 illustrate mathematically the operation of embodiments of the invention.
Figure 18:
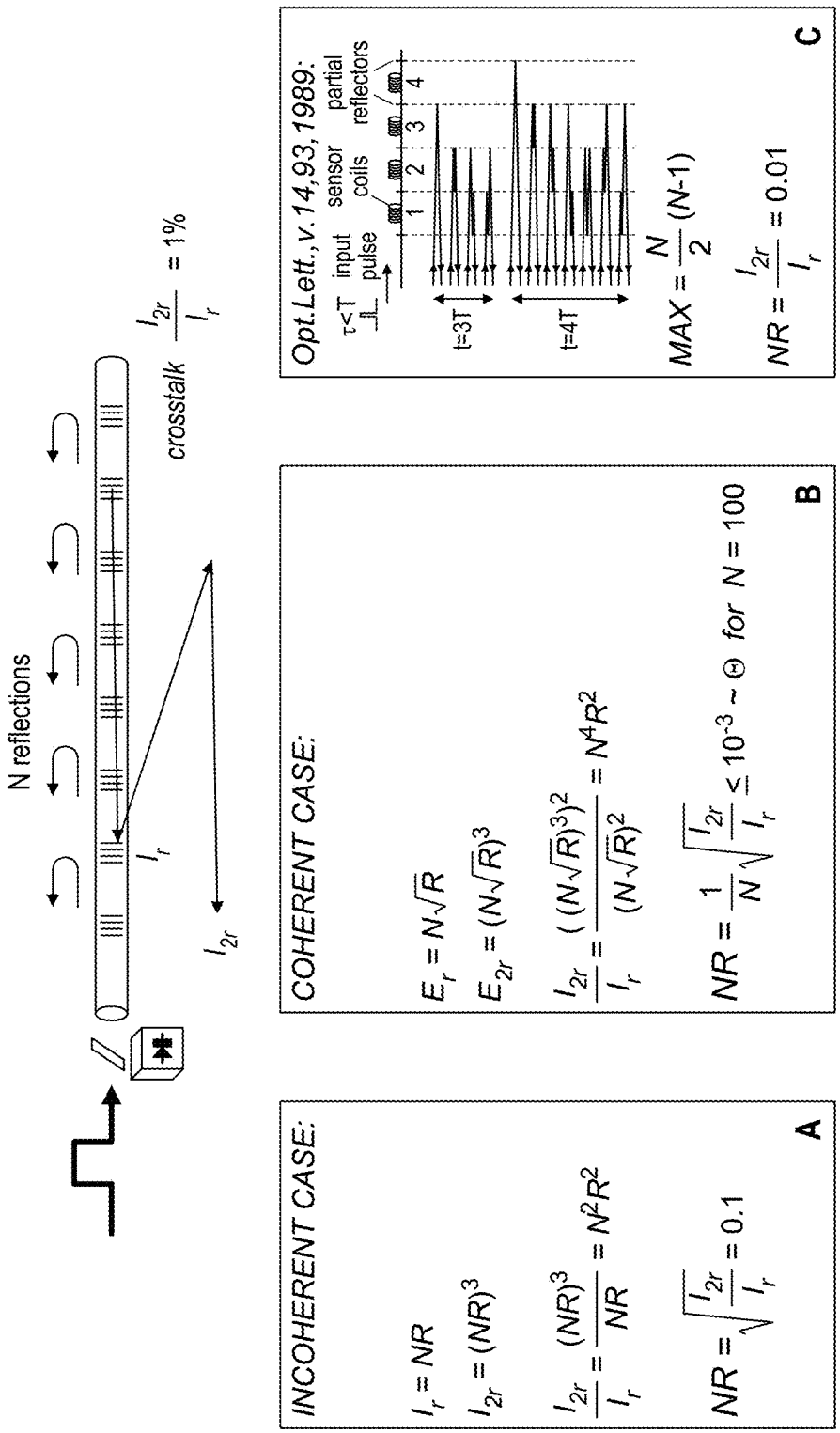

FIGS. 17 and 18 illustrate the concept of embodiments of the invention numerically. In FIG. 17A, a typical DAS scenario of the prior art is considered. Here, the main DAS limitation is the scattering light losses as only a small part of the scattered light ($\Theta=10^{-3}$) comes back along the fiber, and in reality often an even smaller number ($\Theta=10^{-4}$) can be practically used. In contrast, in a typical time domain interferometric multiplexed setup, such as shown in FIG. 17B (and taken from Kersey et al. *Cross talk in a fiber-optic sensor array with ring reflectors*, Optics Letters, Vol 14, No. 1 Jan. 1 1989) up to third of photons may be used for measurement purposes.

Therefore, in order to increase the amount of light returned along the fiber available for sensing purpose in the type of DAS considered herein, as discussed above consider the intermediate setup shown in FIG. 17C, where backscattering is enhanced by deliberately placing weak, broadband reflectors at points along the fiber. As modelled here, the reflectors are fiber Bragg gratings (FBGs), as discussed previously. To deliver a crosstalk of less than 1% the total reflection along the whole length of fiber should preferably be less than 10% (RN<0.1) and with such constraints it is possible to cover 3 km of fiber by gratings with a 10 m period. Such a system can then deliver a shot noise more than 10 times better than current DAS systems, as discussed earlier.

Considering the issue of crosstalk again, a crosstalk estimation for the previous DAS arrangements (shown as the set of equations FIG. 18A) gives optimistic results based on incoherent addition of back-reflected light, when between 100 and 1000 times more photons can be involved in acoustic measurements with respect to ideal Rayleigh backscattering (NR-1000, where $\Theta=10^{-3}$ is stereo angle of scattering). Contrary if we suppose that all light is coherent and optical fields should be added instead of intensities then the result is quite pessimistic, see FIG. 18B. In this case a set of low contrast Fabry-Perot interferometers such as described in the Kersey paper ibid is not more effective than backscattering (for the same crosstalk 1%) as NR~Θ. The Kersey findings are presented at FIG. 18C; the result is intermediate NR~10Θ only moderately better than Rayleigh. This result can be an explanation why such simple acoustic antennae were not popular for 25 years of hydrophone time domain multiplexing. Nevertheless near 10 times SNR improvement can be potentially achieved with a real system keeping in mind real DAS visibility and losses.

Figure 19:
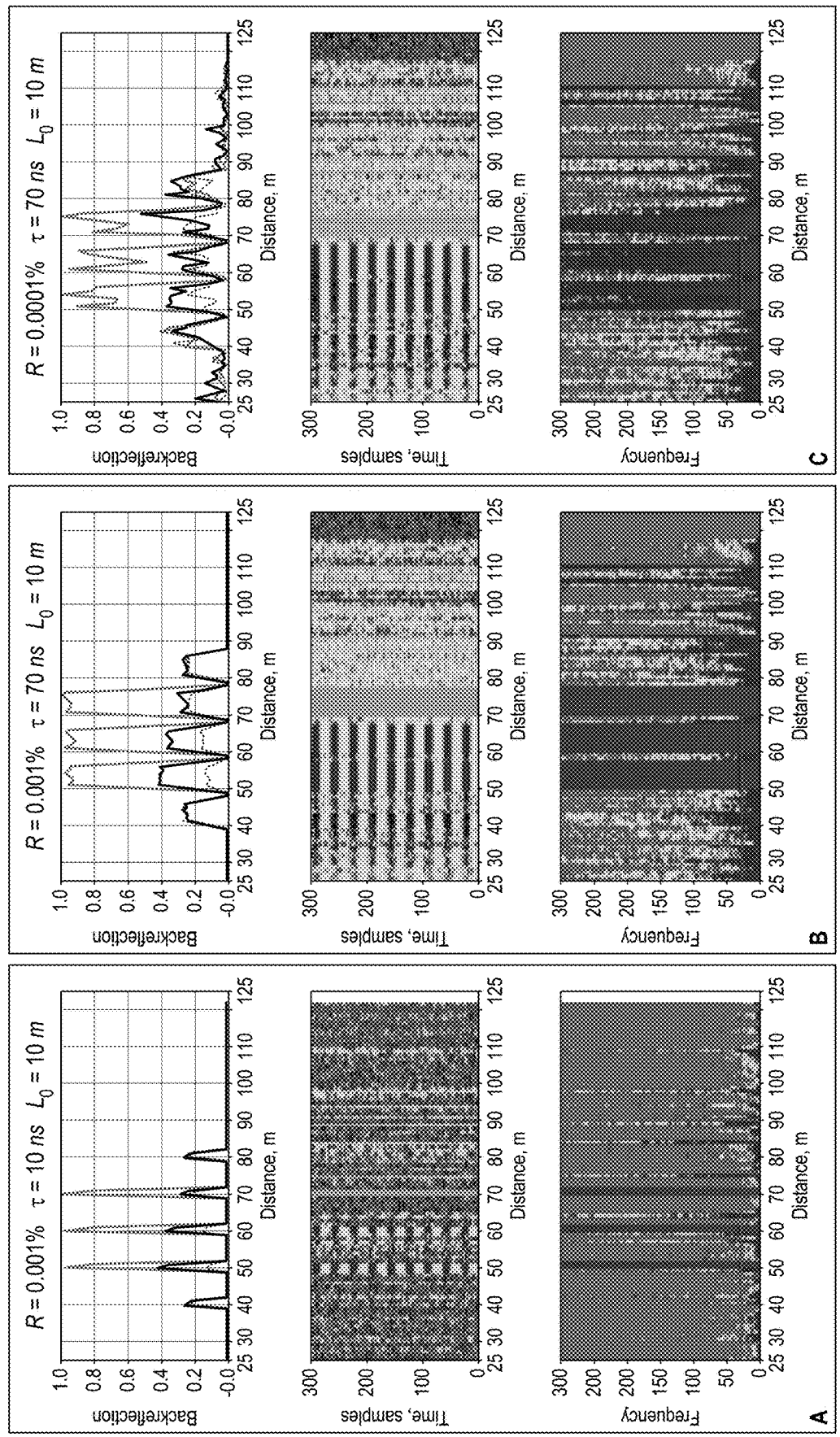
FIG. 19 is a series of sets of results illustrating performance improvements obtained using embodiments of the invention.

FIG. 19 illustrates the results of testing the concept on a fiber model with 4 gratings with reflectivity 0.001% separated by 10 m which are clearly visible under short pulse (10 ns) illumination (see FIG. 19A). As far as a 10 m resolution DAS was used we can see also additional reflections delayed by the gauge length (the path length difference between the arms 105 and 106 of the interferometer in the DAS, and which sets the initial spatial resolution of the DAS), so interference was inside 3 low contrast Fabry-Perot interferometers. An acoustic signal was applied for 2 of them only, as visible on the waterfall graphs (the middle graphs) measured with 1 m sampling. Here, it can be seen that the acoustic signal is applied repeatedly every 30 time samples or so at a distance of between 50 m and 70 m along the fiber. A longer optical pulse (70 ns) can generate more signal as is clear from FIG. 19B. The red horizontal line in the spectrum corresponds to the acoustic modulation zone (i.e. where the acoustic signal was applied); optical crosstalk to the third interferometer located between 70 m and 80 m is negligible.

Finally a tiny reflection was modelled which was only 10 times bigger than backscattering level (R=0.0001%), see FIG. 19C. Nevertheless the DAS signal improvement was even more than 3 times (as can be expected from a shot noise), partly because of good visibility. The modelling results confirm that the SNR improvement can be even more than 10 times.

Figure 20:
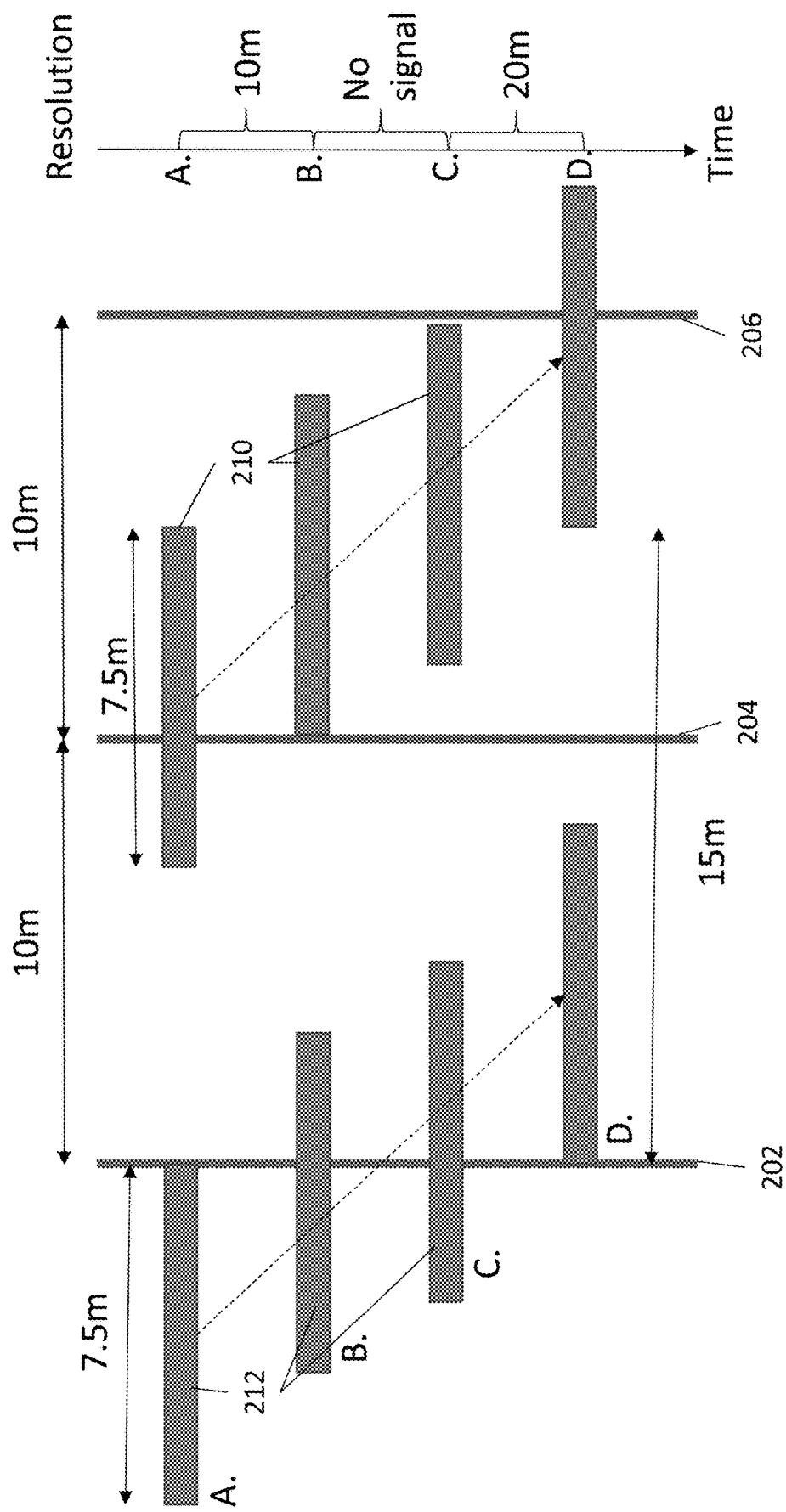
FIG. 20 is a diagram illustrating how pulses may be reflected to provide dual-resolution operation in an embodiment of the invention.
Figures 1, 21:
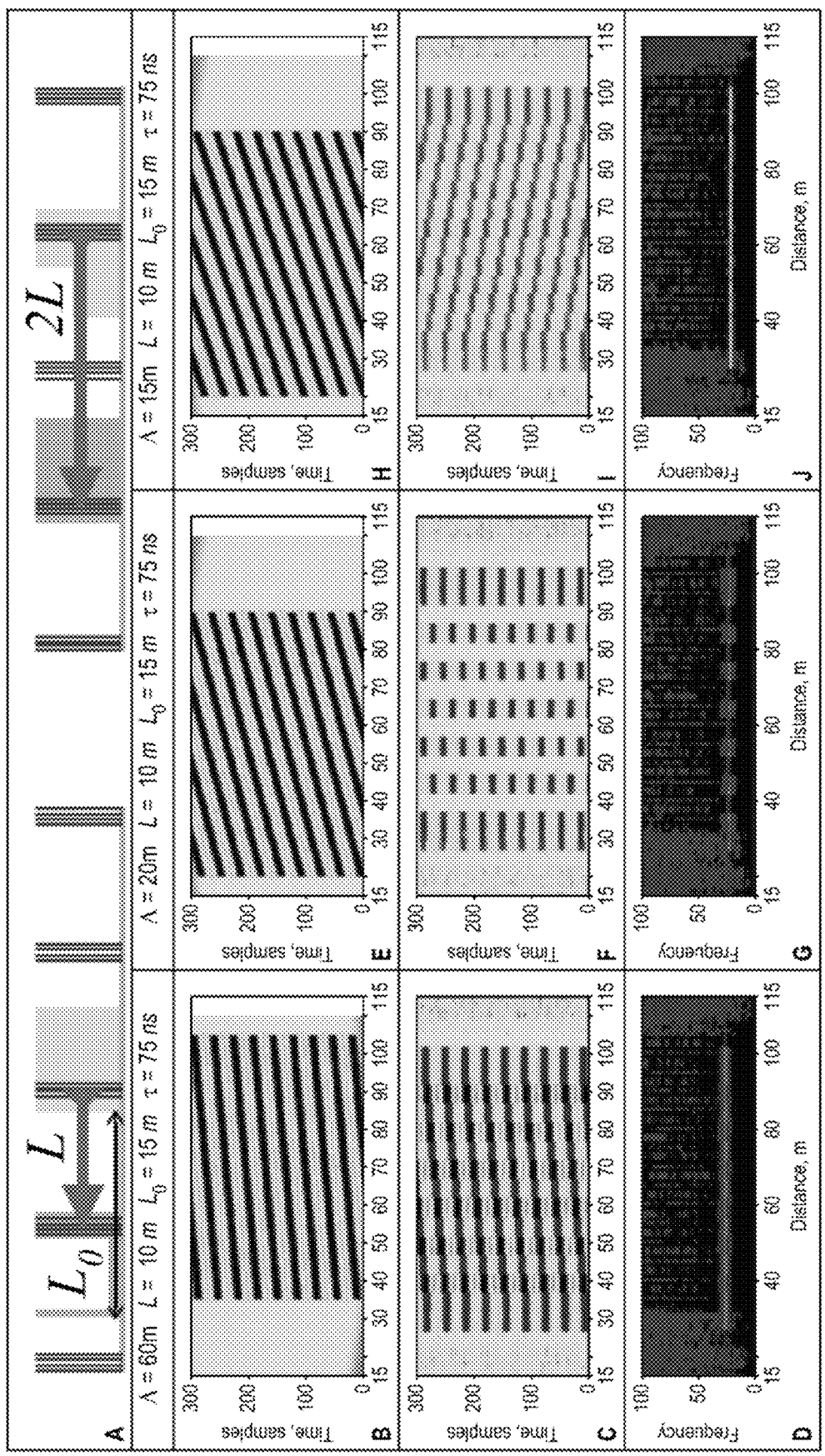
Figures 2, 21:
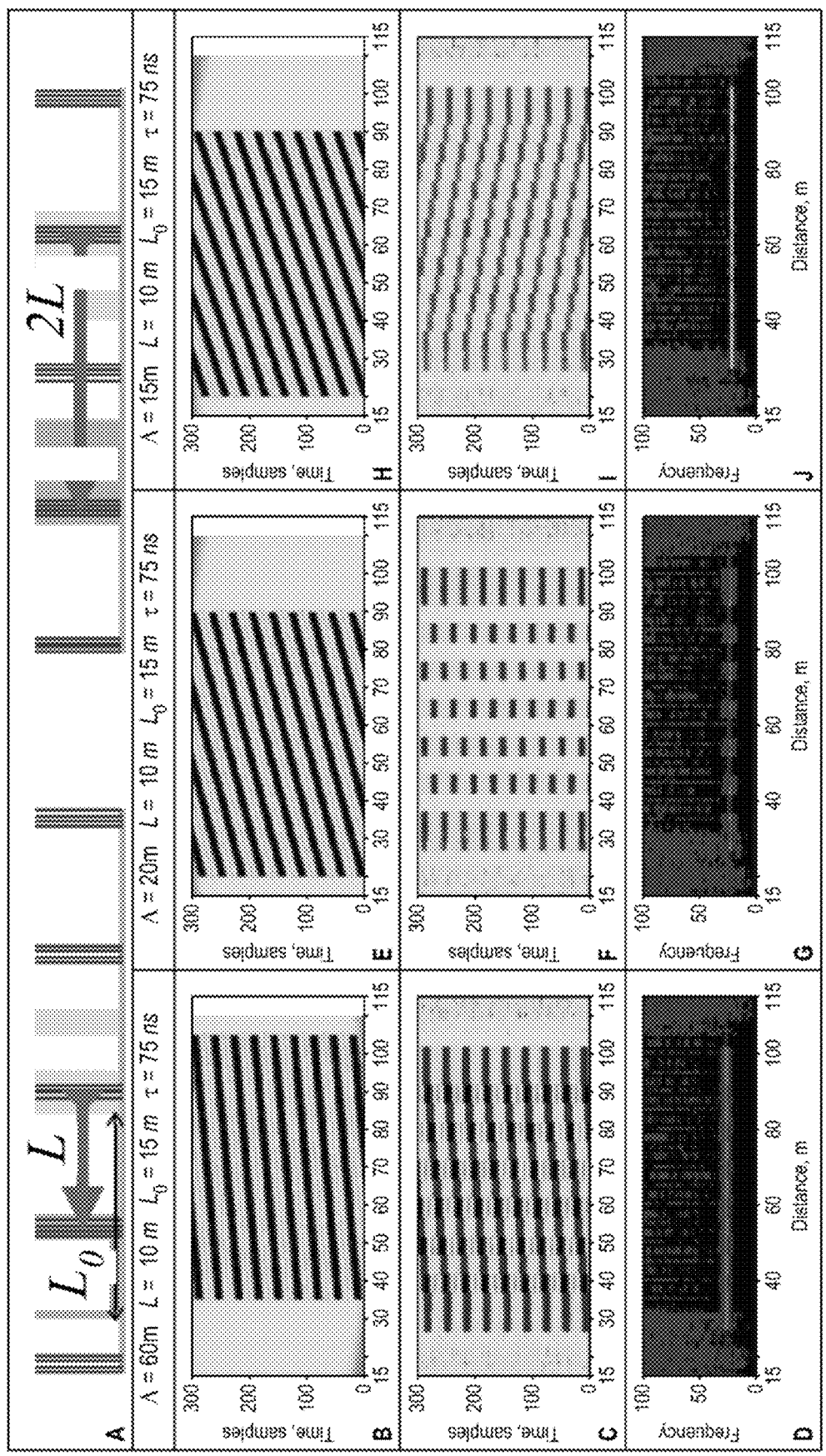

One interesting advantage of the using regularly spaced reflectors in the sensing fiber is that by selection of appropriate optical pulse parameters, and particularly pulse width in combination with the gauge length of the interferometer with respect to the reflector spacing, then a multi-resolution distributed acoustic measurement can be obtained simultaneously. FIGS. 20 and 21 illustrate the arrangement in more detail.

In FIG. 20, assume we have a fiber with reflectors, which may, for example, be the gratings described in the above embodiments, spaced every 10 m. These are shown as reflectors 202, 204, and 206 on FIG. 20. The reflectors are regularly spaced in at least one portion of the fiber where it is desired to undertake dual-resolution sensing. Of course, in some embodiments this may be along the whole length of the fiber. In other embodiments, different sections of fiber may have reflectors spaced at respective different spacings, such that different spatial resolutions are obtained from the respective different sections.

Now, given such a fiber, if we control the DAS system to produce optical pulses to be sent into the fiber such that the pulse width is less than the reflector spacing, but where the gauge length of the DAS system (i.e. the path length difference 109 between the arms 105 and 107 of the DAS sensing interferometer 713) is greater than the reflector spacing then as a pulse travels along the fiber there will be an instance during which the respective reflected light from the pulse in the arms 105 and 107 of the interferometer is from consecutive reflectors, in which case during this time a sensing resolution equal to the reflector spacing is obtained. There will next then be an instance where there is only reflected light in one of the interferometer arms and not the other (due to the delay therebetween), in which case no output signal is obtained, and then following this there will then be an instance when the respective reflected light in the interferometer arms 105 and 107 is from a first reflector, and not the next reflector but instead the reflector next to that along the fiber i.e. 2 reflector spacings along, in which case at that time the sensing resolution is twice the reflector spacing. Hence, with such operation a dual spatial resolution is obtained, alternating between a first spatial resolution and a second, doubled, resolution. FIG. 20 illustrates this concept in more detail.

For the sake of convenience, in FIG. 20, a pair of pulses are shown travelling down the fiber, the fiber being provided with reflectors 202, 202, and 206 spaced 10 m apart. The pair of pulses described here, for the sake of ease of description, correspond to an actual pulse 210 transmitted along the fiber from the DAS, and, in the case of receiving interferometer arrangement, a virtual delayed pulse 212, delayed by the gauge length of the interferometer. Of course, in reality the virtual delayed pulse 212 never actual travels along the fiber, but is instead generated as a delayed version of the reflections of the actual pulse 210 in the arm 105 of the interferometer 713, as described above. However, for the sake of descriptive convenience to illustrate the operation of the present embodiment, the virtual delayed pulse can equally be thought of as virtually travelling along behind the actual pulse along the fiber, separated therefrom by the gauge length, and in the following this model is adopted. However, it should be noted that in reality the delayed pulse is only ever in existence in the form of reflected light from along the fiber from the actual pulse when delayed in arm 105 of the interferometer, and hence pulse 212 travelling along the fiber is a virtual pulse provided for the sake of descriptive convenience only.

With the above in mind, in this example the pulses have respective lengths of 7.5 m, and the pulse separation (corresponding to the gauge length) i.e. from falling (or rising) edge to falling (or rising) edge is 15 m; hence there is a 7.5 m gap between the falling edge of the leading pulse and the rising edge of the following virtual pulse. These timings between the pulses and relating to their lengths are maintained as the pulses travel along the fiber.

At time A the leading actual pulse 210 is positioned so that it is still passing over reflector 204, such that some of the pulse is reflected back along the fiber as the pulse passes over the reflector. In contrast, the trailing virtual pulse 212 is just incident on reflector 202, and hence is just about to start reflecting some of its light back along the fiber (in reality of course, as noted above the light considered to be reflected from the virtual pulse is actually earlier reflected light from the actual pulse, subject to the gauge length delay in the interferometer). Thus, between time A and B, a small portion of actual pulse 210 is reflected from reflector 204 whilst a small portion of virtual pulse 212 is reflected from reflector 202. This reflected light from both pulses then travels back along the fiber where it can then be processed in the DAS, for example by being interfered together in the DAS interferometer, so as to allow a DAS signal with resolution equal to the distance between the reflectors 202 and 204 i.e. one reflector spacing, in this case 10 m to be found. Hence, between times A and B DAS output with spatial resolution of 10 m i.e. one reflector spacing is obtained.

Now consider the period from B to C. At time B leading actual pulse 210 is no longer over reflector 204, and instead is between reflector 204 and reflector 206. Hence, there is no reflection from this pulse. Trailing virtual pulse 212 is still "passing" over reflector 202 at point B and hence some light is reflected therefrom, but because there is no light from actual pulse 210 to interfere with in the DAS, no signal is produce at this time. This situation continues until time C, at which point leading actual pulse 210 then starts to pass over the next reflector 206. At this time, trailing virtual pulse 212 is still "passing" over reflector 202, located two reflector spacings away from reflector 206. Light is therefore reflected back along the fiber from both pulses, but this time from reflectors that are twice the distance away from each other than previously. Hence light from two reflection points is available to be interfered in the DAS interferometer (or otherwise processed in the DAS) to obtain an output signal, but this time because the distance between the sensing points is doubled, the spatial resolution of the DAS output signal is also doubled (or halved, depending on terminology) to twice the reflection point spacing, or 20 m in this example.

This 20 m sensing resolution is then obtained from time C to time D, during which the leading actual pulse 210 passes over reflector 206, and the trailing virtual pulse 212 passes over reflector 202. During time C to D, therefore, a sensing resolution output of 20 m, or twice the reflector spacing, is obtained. At time D the trailing virtual pulse 212 finishes passing over reflector 202, and hence from time D no signal is obtained, until trailing virtual pulse 212 is incident on the next reflector 204 (not shown). At this point in time, the leading actual pulse 210 would still be passing over reflector 206, and hence the same situation as shown at time A would pertain, except for the next pair of reflectors along the fiber i.e. 204 and 206, rather than 202 and 204. The process therefore repeats, for each successive pair of reflectors along the fiber.

With the above therefore, what is obtained is a dual-resolution DAS where the sensing resolution alternates between one reflector spacing and two reflector spacings as the actual pulse travels along the sensing fiber. This is an important result, because DAS systems suffer from what is referred to as antenna effect, in that if the incident acoustic wavelength, travelling along the fiber axis, is equal to the gauge length then no signal is obtained; the fiber experiences an equal amount of tension and compression over the gauge length and so no meaningful signal is measured. However, with the auto dual resolution arrangement provided by the use of regularly spaced reflectors and careful choice of pulse width and gauge length in dependence thereon, antenna effect can be negated at least at the longer resolution, as measurements at the smaller resolution will also be being made automatically.

FIG. 21 illustrates the dual sensitivity arrangement again, together with some simulated results. The principle is shown at FIG. 21A, where an optical pulse and its delayed-over-L0 virtual echo travel along the fiber they cover consequently one or two zones between reflectors separated by the distance L~2/3L0. In other words the sensitivity base of the DAS is changing along the fiber from L to 2L and back again, as the pulses travel therealong. This option was demonstrated by modelling for L0=15 m, with 75 ns pulse (~7.5 m pulsewidth) and 1 m sampling for different acoustic wavelengths. If the wavelength (A) is 60 m (so it is significantly longer than L and L0, see on FIG. 21B) then the DAS output pattern (FIG. 21C) follows it, but some space zones have twice the amplitude, see also a spectrum shown on FIG. 21D.

Further results for where the wavelength is equal to twice the reflector distance L i.e. A=2L=20 m are presented on FIG. 21E-G. In this case zones which correspond to 2L sensitivity base show no signal, due to the antenna effect mentioned above. This emphasises the advantage of the concept: for long acoustic wavelengths i.e. where A>>2L then the 2L long sensitivity base can be used to improve SNR, but for short wavelengths i.e. where A~2L then the short base length L demonstrates better SNR.

Figure 23:
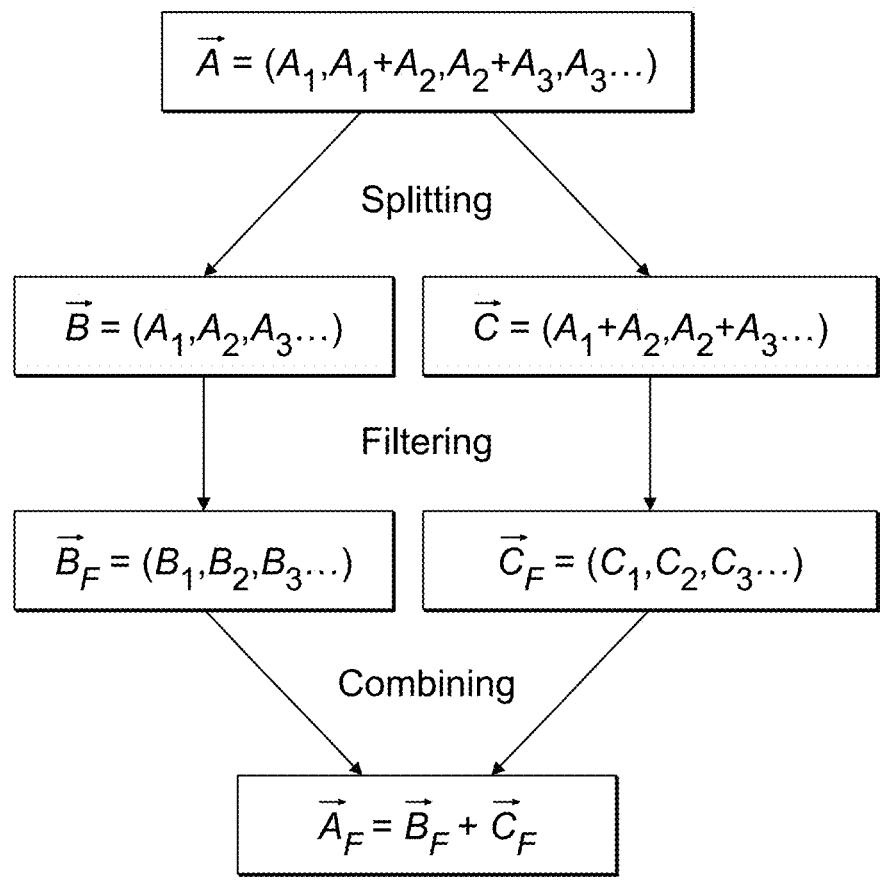
FIG. 23 is a diagram illustrating a processing chain for the data derived from the dual-resolution system.

The last pictures (FIG. 21H-J) demonstrate a DAS output for where the wavelength is between the dual sensitivities i.e. between 10 m and 20 m. Generally, therefore, where L<A<2L. Here, signal to noise ratio (SNR) is still moderate but special processing is necessary to transform the output pattern into a shape corresponding to the input (compare FIGS. 21H and I). One algorithm for such transformation is presented on FIG. 23. Here, a 2D vector of channels A is split into zones each corresponding to L and 2L (to give B and C), then each is filtered (including deconvolution if necessary) separately to produce Bf and Cf correspondently. A final result can then be produced by combining Bf and Cf to give Af=Bf+Cf containing full flat spectrum with optimum SNR.

A further embodiment will now be described with respect to FIGS. 22A to C. Here, FIGS. 22A and C show again the embodiments described above: an optical pulse (and its delayed-over-L0 virtual echo shown as a light grey rectangle) travelling along reflectors separated by the distance L=L0. The pulsewidth in this case should be slightly less than the reflector separation, say 10 ns (~1.0 m) for L=1.5 m.

Figure 22:
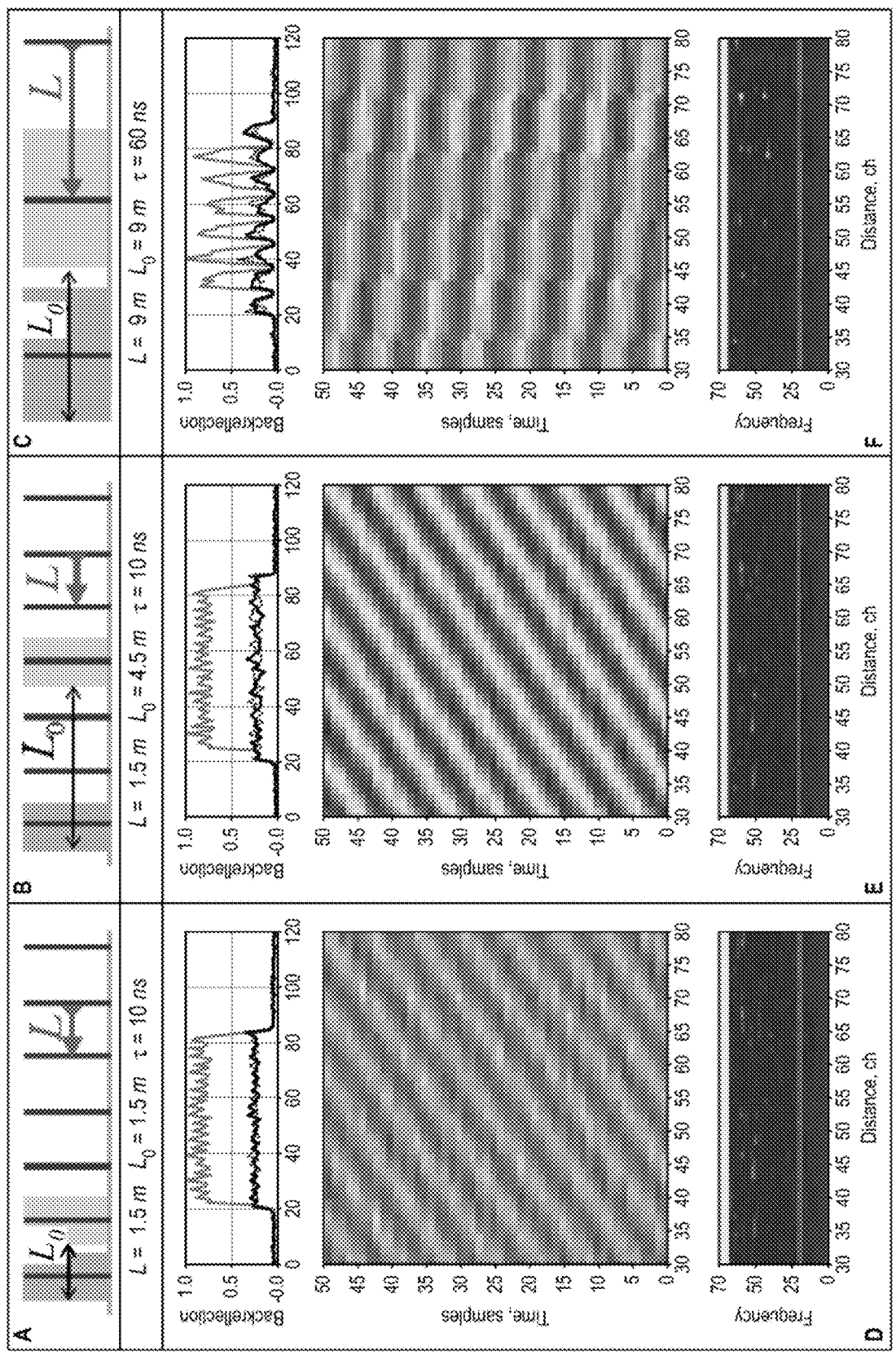
FIGS. 22A to F illustrate another embodiment where denser spacing is used to allow for resolution selectivity in an embodiment of the invention.

Now consider an alteration of this setup where the gauge length (L0) is now chosen to be a multiple larger than 1 of the reflector separation, see FIG. 22B, where L0=3L. In this case only the illuminated reflectors i.e. those which a pulse is presently passing over produce a reflected signal and so affect the output signal, and hence acoustic antenna length can then be chosen from a range of lengths corresponding to different multiples of the distance between the reflectors to optimise the output. That is, the gauge length can be chosen to select how many reflectors are between the pulse pairs, and hence the spatial resolution of the DAS may be controlled using a fibre with a fixed set of reflection points.

This option was demonstrated by modelling for a L0=4.5 m DAS, with a 10 ns pulse and 1 m sampling for separation between reflectors of L=1.5 m and acoustic wavelengths A=7 m. A better SNR was found in this case than for cases where the pulse separation (from falling edge to falling edge) is equal to the spacing between the reflectors, for the cases where the spacing is small (e.g. ~1.5 m) and larger (e.g. ~9 m)—please compare FIG. 22E with FIG. 22D or 22F, and it is seen that a clearer image is obtained.

With respect to selecting the spatial resolution, as mentioned above, this is performed by selecting the pulse width and the virtual pulse separation (gauge length) characteristics, such that the desired number of reflectors are encompassed by the sum of the pulse width and the pulse separation to give the resolution required. Thus, for example, from FIG. 22B it can be seen that by increasing the virtual pulse separation (or gauge length) L0 so as to encompass a greater or lesser number of reflectors, then a greater or lesser spatial resolution can be obtained. This further embodiment therefore gives a very convenient way of changing the spatial resolution of the DAS system without requiring additional hardware, and to allow fast, pulse to pulse changes of resolution.

Various modifications and additions will now be described with respect to FIGS. 24 to 34, in order to provide further embodiments of the invention.

Figure 24:
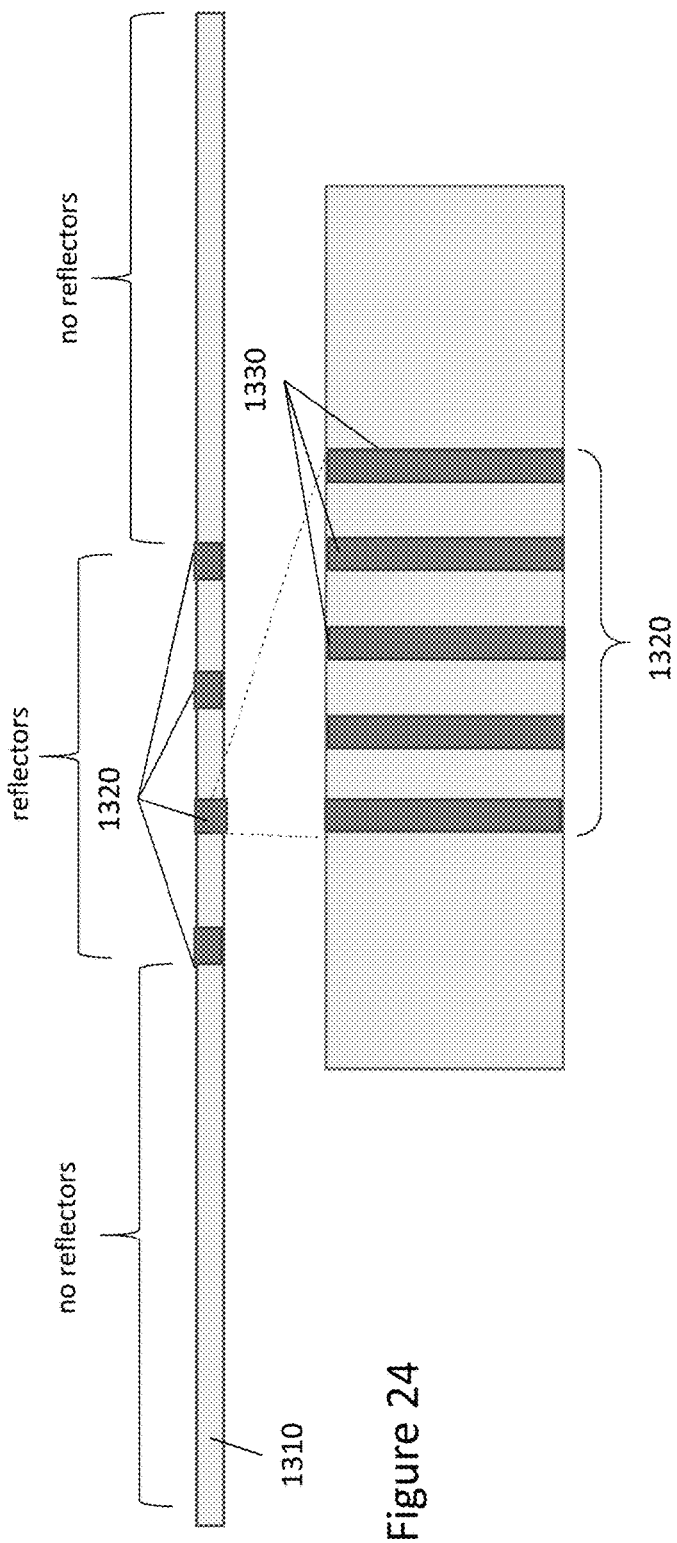
FIG. 24 is a diagram illustrating how the reflectors may just be in a subset of the fiber.

FIG. 24 illustrates one modification that may be made to any of the above described embodiments. Here it is shown that the reflectors 1320 need not be provided all the way along the fiber 1310, but instead can be provided only in specific sections, with further sections of fiber then in between in which no reflectors are provided. One or plural sections of fibers may be provided each having multiple reflectors provided therein distributed therealong. These sections may then be interspersed between conventional lengths of fibers having no reflectors therein. The advantage of such an arrangement is that the range of the optical fiber distributed sensing system can be increased, by only providing the reflectors in those portions of the fiber that are located where sensing is actually desired. The lengths of fibers in between those locations which are not provided with reflectors then effectively become relatively lower-loss transmission portions for transporting the optical pulses between the sensing portions provided with the reflectors. In effect, the optical fiber can be characterised as having pulse transmission portions where no reflectors are provided, in between one or more sensing portions in which the reflectors are distributed therealong.

In addition, with such an arrangement, it is possible to make distributed acoustic measurements by measuring the backscatter between the grating regions, using the iDAS. Such arrangements can be implemented using a fast switch and attenuators along the detection path as well as multiple interferometers in the iDAS for segments with different spatial resolutions.

Figure 25:
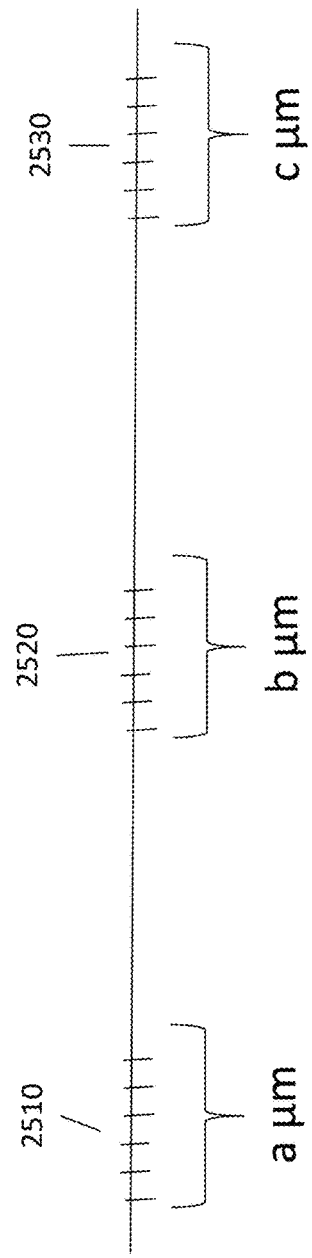
FIG. 25 is a diagram illustrating that the grating reflectors may have different reflection bandwidths.

FIG. 25 illustrates a further variant of the above. Here three sensing portions 2510, 2520, and 2530 of fiber are provided, each provided with plural reflectors 1320. The sensing portions of fiber are dispersed at different longitudinal positions along the whole fiber, and are connected by transmission portions of fiber within which no reflectors are provided, and hence which are relatively low loss for carrying the optical pulses from sensing portion to sensing portion. In the arrangement of FIG. 25, however, each sensing portion 2510, 2520, and 2530 has reflectors that reflect different, substantially non-overlapping, wavelengths of light. That is, the reflectors in the first sensing portion 2510 reflect light around a µm, those of the second sensing portion 2520 reflect light around b µm, and those of the third sensing portion 2530 reflect light around c µm. At wavelengths that the reflectors don't reflect the incident light is transmitted by the reflectors with substantially no additional loss.

With such an arrangement the optical fiber distributed sensor system is able to provide spatial selectivity in terms of which set of reflectors at which spatial location it wants to receive reflections from (and thereby enable sensing at that location), by varying the wavelengths of the transmitted pulses to match the reflector wavelengths of the set of reflectors that are to be selected. Hence, varying the wavelengths provides the spatial selectivity of where the sensing system will sense, specifically which set of reflectors will provide reflections from which sensing can then be undertaken.

Additionally, because the non-selected reflectors do not reflect substantially at the wavelengths of the pulses being transmitted along the fiber for the selected set of reflectors, losses from unwanted reflections are kept to a minimum, and the sensor range is increased.

Figure 26:
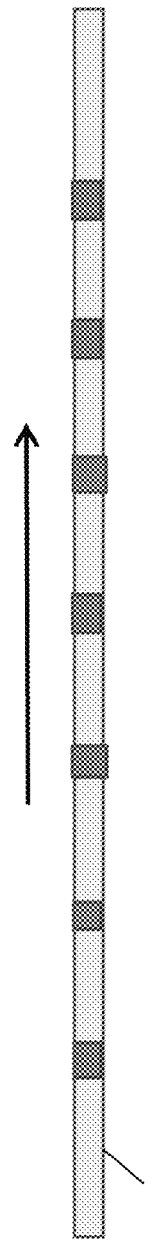
FIG. 26 is a diagram showing that the gratings may increase in reflectivity along the fiber.

FIG. 26 illustrates a further modification that may be made to provide further embodiments of the invention. Here, the fiber 1310 is again connected to an optical fiber distributed sensor system (not shown), and is provided in at least one sensing portion thereof (or alternatively, all along its length) with reflector portions the reflectivity of which are different along the length of the fiber. In particular, in one embodiment shown in FIG. 26 the reflectivity of the reflector portions increases along the length of the fiber with distance from the optical pulse source in the optical fiber sensing system, such that reflector portions further away from the source have greater reflectivity than those nearer the source.

The reflectivity in some embodiments increases deterministically in accordance with a mathematical function of the distance along the fiber. For example, the mathematical function may be a monotonic function relating distance along the fiber to reflectivity.

One of the primary motivations for altering the reflectivity of the reflectors along the fiber is to account for crosstalk between the reflectors. Crosstalk results from unwanted light, which has undergone reflections off multiple reflectors, returning coincidently with the signal of interest, which undergoes one reflection only. Whereas the wanted optical power strength will be proportional to R (the reflectivity of a single reflector), the crosstalk signal (if we ignore optical losses and assume equal reflectivity for all reflectors) will be approximately proportional to $N \times R^3$, where N is the number of optical paths that allow the crosstalk light to arrive at the detector coincidently with the signal light.

The crosstalk can be minimised by reducing both N and R; however the useful optical signal is maximised by increasing R and the spatial resolution is optimised by increasing the number of reflectors, and hence N. Thus a compromise between crosstalk, spatial resolution and signal to noise ratio (which is governed by the optical signal level) must be found for a particular target application through the appropriate choice of N and R.

Note, N, and hence the amount of crosstalk experienced by the signal, increases along the fibre length. For example, there is no crosstalk for the first pair of reflectors as there is no valid crosstalk optical path which allows the crosstalk light to arrive coincidently with the signal light. Similarly, the contribution of crosstalk from acoustic signal generated towards the beginning of the fibre is larger than the contribution of the same signal level towards the end of the fibre. This is because there are many more valid crosstalk optical paths which encompass reflectors towards the beginning of the fibre than towards the end. For example, a reflection off the last reflector in the fibre has no valid path where it can contribute to crosstalk whereas a reflection off the first reflector can contribute to crosstalk by reflecting light from any other reflectors.

This means that if the acoustic signal level is constant along the fibre, and if the reflectivity of the reflectors is also constant, the influence of the crosstalk increases along the fibre length, and the acoustic signal impinging on the near end of the fibre contributes more to the crosstalk than that impinging on the far end of the fibre.

In order to address this issue an elegant approach to optimise performance in response to this property is to vary the reflectivity of the reflectors along the fibre length. In this case, the nearer reflectors (which contribute more to crosstalk) are chosen to have a lower reflectivity than the far reflectors. In this way is it possible to equalise, or otherwise tune as wished, the crosstalk response of the fibre. This type of reflectivity profile is also beneficial in that the reflectivity can be tuned to also compensate for the optical losses in the fibre (and through any connectors/splices or other losses along the optical path) and so equalise, or otherwise tune, the signal to noise performance, as well as tune crosstalk, along the fibre.

In addition, the crosstalk contribution from regions along the optical path with a large acoustic signal of low importance (for example loud surface noise in an oil well installation) can be negated by choosing a low reflectivity reflectors (or no reflectors) along that section.

In some applications, the signal of interest is towards the far end of the installation (for example the perforated section at the bottom of an oil well). In this case, the crosstalk contribution from the near end of the installation (the top of the oil well, which may be very noisy) can be minimised by deploying the fibre in a "U" arrangement where the reflectors may be positioned in the far end of the leading fibre and may be then continued to the top of the return fiber. In this case, the laser light is launched down the fibre leg with no reflectors, such that the first reflector encountered is at the bottom of the well. This ensures a good crosstalk behaviour as the region of interest at the bottom of the well is positioned first in the optical path, and so encounters minimal crosstalk. Also the loud section, at the top of the well, is positioned at the end of the optical fibre and so does not contribute crosstalk to the majority of the optical path, including the particular region of interest.

Figure 27:
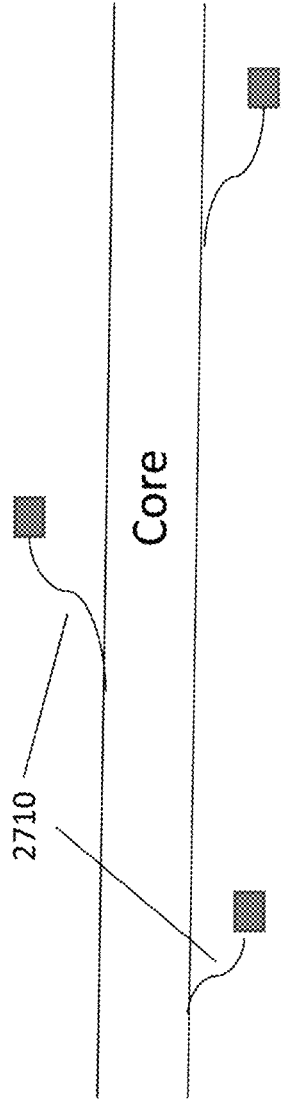
FIG. 27 is a diagram illustrating how gratings may be formed within the cladding coupled to the core of the fiber, rather than in the core itself.

FIG. 27 illustrates one way of forming the reflector portions in the cladding of the fiber, rather than in the core. Here, instead of the gratings being formed in the core of the fiber itself, they are instead formed in the cladding layer, and coupled into the core via waveguides 2710. In use light propagating along the core couples into the waveguides 2710 and is fed to the gratings 1320, from where it is then reflected back along the fiber.

Figure 29:
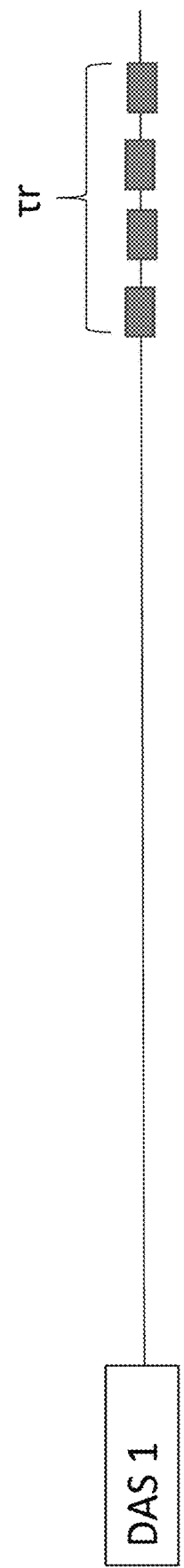
FIG. 29 is a diagram illustrating that the gratings may be provided in just one segment of fiber, and the pulse timing adjusted accordingly.

FIG. 29 illustrates a further embodiment, related to adapting the pulse repetition rate of the DAS. As described previously in embodiments of the invention the DAS operates by sending an optical pulse along the fiber, and then measuring reflections from reflector portions positioned along the fiber, as described above. We describe above how it is possible to only provide reflectors in a single portion of the fiber, located where sensing is desired. FIG. 29 shows in simplified form such an arrangement, where a single set of reflectors is provided at a single sensing portion of the fiber, with the remainder of the fiber between the sensing portion and the DAS being substantially free of sensors.

With such an arrangement, usually if it was desired to sense along the whole length of the fiber then one pulse at a time would be transmitted on to the fiber, with the time between pulses equal at least to the speed of the pulse along the fiber, plus the return time for backscatter from along the length of the fiber. Of course, given the speed of light in the fiber this still allows for very high pulse repetition rates, and hence high sampling frequencies, typically as high as 100 kHz.

However, if it is desired to sense only along a smaller sensing portion of the fiber, such as the sensing portion provided with reflectors, then the pulse transit time that is important is the transit time for the pulse to transit the sensing portion only, plus the transit time for backscatter from along the length of the sensing portion. If the pulse transit time is $\tau r$, then allowing time for the backscatter the minimum pulse spacing is $2\tau r$, plus typically some sort of small guard time g in between pulses, which may be say 10% of $\tau r$. The pulse repetition rate can then be increased to $1/(2\tau r+g)$, which, depending on the relative length of the sensing portion compared to the whole fiber length, will be significantly higher than the pulse repetition rate required to provide whole length of fiber sensing. As a consequence, the sampling frequency of the DAS can be increased, so as to allow the DAS to detect higher frequencies.

Generally, the pulse repetition rate of the DAS can be increased by a factor equal to the ratio of the transmission portion of the fiber to the sensing portion. For example, therefore, if the sensing portion is provided only along one quarter of the length of the fiber then the pulse repetition rate may be increased by a reciprocal amount i.e. by a factor of four.

Figure 30:
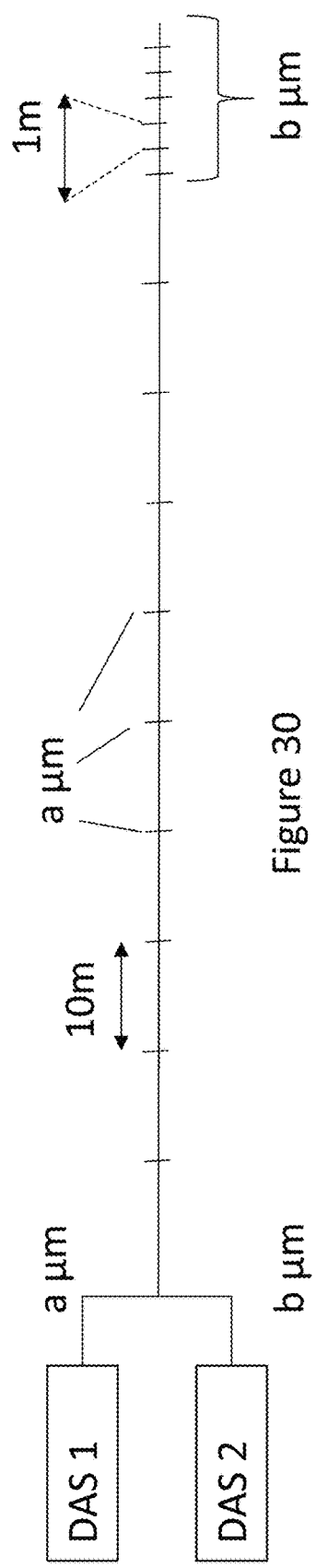
FIG. 30 is a diagram showing an alternative dual resolution arrangement with different reflective spacing which can also be centred at different wavelengths.

FIG. 30 shows a further arrangement where two DAS systems are multiplexed on to a single fiber, and the fiber is provided with reflectors in two distinguishable sensing portions, being a first portion where the spacing between the reflectors is greater than the spacing between reflectors in a second portion. The reflectors in the first portion are arranged to reflect a first wavelength a μm, and the reflectors in the second portion are arranged to reflect a second wavelength, b μm. As shown, in this example the reflectors in the first portion are spaced by 10 m, and the reflectors in the second portion are spaced more closely together to give a higher spatial sensing resolution of 1 m.

Two DAS systems, DAS1 and DAS2 are provided both multiplexed onto the single sensing fiber. DAS1 operates at the first wavelength a μm, whereas DAS2 operates at the second wavelength b μm. Providing two DAS systems multiplexed on to the same fiber allows for simultaneous multi-frequency operation, which in this case provides for simultaneous multi-spatial resolution operation, due to the different reflector spacings in the two sensing portions. Hence, with such an arrangement multiple sensing resolutions can be obtained simultaneously from different parts of the same fiber.

In a variant of the above, instead of the different wavelength reflectors being provided in different portions of the fiber, they are instead provided along the length of the fiber in overlapping portions, but at the same respective spacings. Because the reflectors are arranged to reflect at different wavelengths, however, being the first and second wavelengths of the DAS1 and DAS2 systems respectively, there is no interference of the respective operations of the two DAS systems, and multi-spatial resolution sensing at the two resolutions is then obtained along the length of the same fiber.

Figure 28:
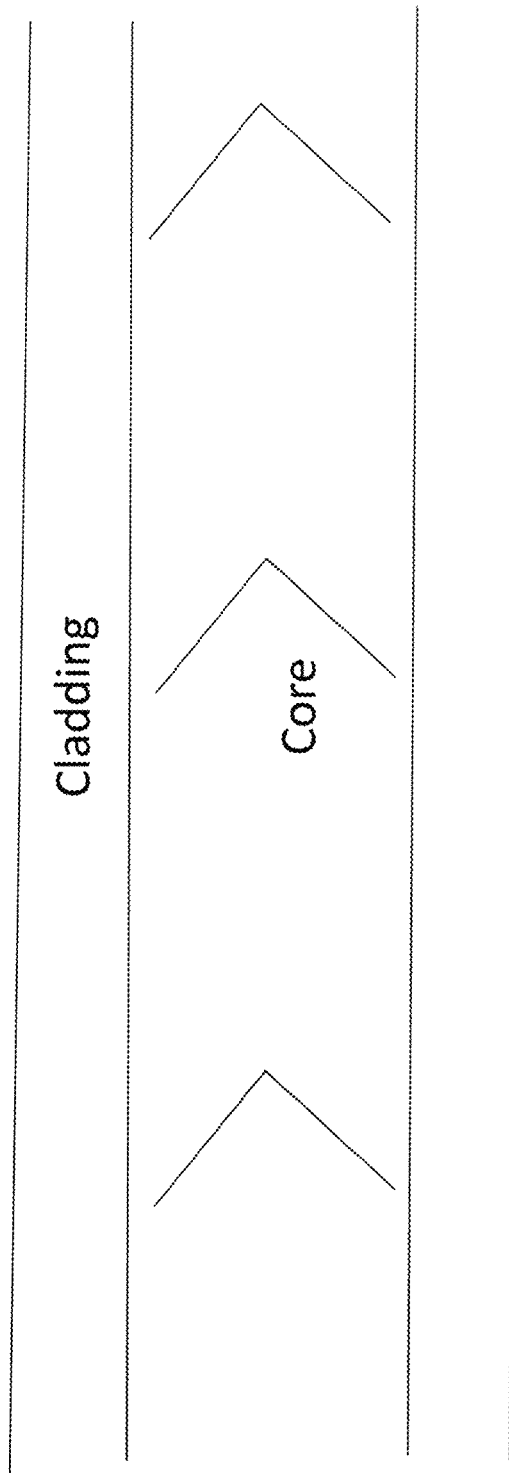
FIG. 28 is a diagram showing how reflectors may be formed in the core of a multi-mode fiber.
Figure 31:
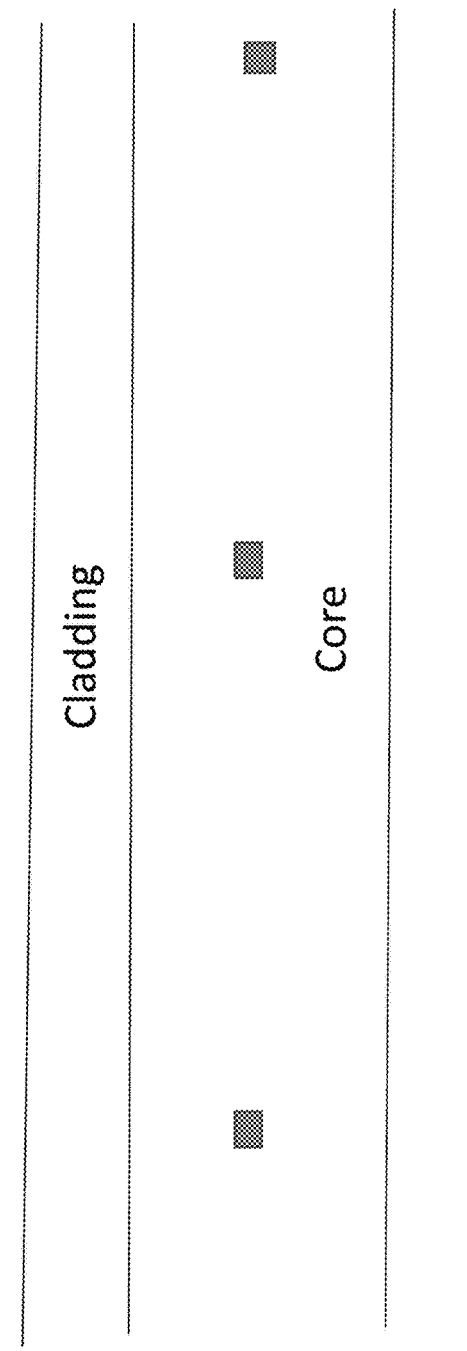
FIG. 31 is a diagram showing how reflectors may be formed in the core of a multi-mode fiber.

FIG. 31 shows a multi-mode fiber embodiment, where the reflector gratings are provided within the multi-mode core, as shown. As is known in the art, multi-mode fiber cores are much wider than single mode fiber cores, but as the DAS systems are internally single mode systems it is sufficient to locate reflector gratings in the center of the core to reflect the lowest order mode, which is the mode that will typically be coupled into the DAS. FIG. 28 illustrates an alternative version, where instead of gratings, weakly reflecting right-angled reflection structures are formed in the core instead.

The operation of such is the same as if gratings were being used, but with the difference that the reflection structures are truly broadband, and will reflect some of the incident light of any wavelength propagating in the fiber.

FIGS. 32 and 33 show multi-core embodiments of the invention. Using multi-core fibers opens up the concept of having "forward" channels for the forward pulse launched from the DAS or DTS system and "return" channels into which the forward light can be reflected for return to the DAS or DTS system. The advantage of having separate forward and return channels is that the return channel will have no backscatter thereon from the forward pulse, and hence a higher signal to noise ratio can be obtained.

FIG. 32 illustrates the basic concept with a multi-core fiber. Here, core 2 is the forward channel onto which the optical pulses from the DAS or DTS system are launched. Co-operatively angled reflectors 3210 and 3220 are provided, one for each of core 1 and core 2, and each angled at 45 degrees to their respective cores, with a 90 degree angle to each other. Such an arrangement means that an optical pulse travelling along the forward channel provided by core 2 is reflected through 90 degrees from reflector 3210 into core 1, and the reflected through a further 90 degrees by reflector 3220 so as to travel in the opposite return direction back towards the DAS or DTS system along core 1. As noted above, because core 1 does not carry the forward pulse, there are no unwanted reflections or backscatter on core 1, the only light carried back to the DAS system is the reflected light on core 1.

FIG. 33 extends the concept further, by providing two return cores, in the form of core 1 and core 3. Providing two (or more) return cores opens up the prospect of multi-spatial sensing resolution along the fiber, by providing different reflector spacings on each of the return cores. In the example shown, corner angle reflectors as described above are provided between the forward core 2 and return core 1 with a spacing of r1, and between forward core 2 and return core 3 with a spacing of r2, wherein r2>r1. With such an arrangement, the combination of forward core 2 and return core 1 provide for sensing with a spatial resolution related to r1, and the combination of forward core 2 and return core 3 provide for sensing with a different, longer, spatial resolution r2.

In further variants of this embodiment, further return cores may be provided, having reflectors at even larger or even smaller spacings, to provide for even more spatial resolutions. Moreover, in some embodiments there is no limitation to having just a single forward core, and depending on the number of cores there may be more than one forward core, each surrounded by a plurality of return cores, with different spaced reflectors from return core to core. Thus, many different spatial resolutions may be measured simultaneously using multi-core fibers.

Figures 1, 34:
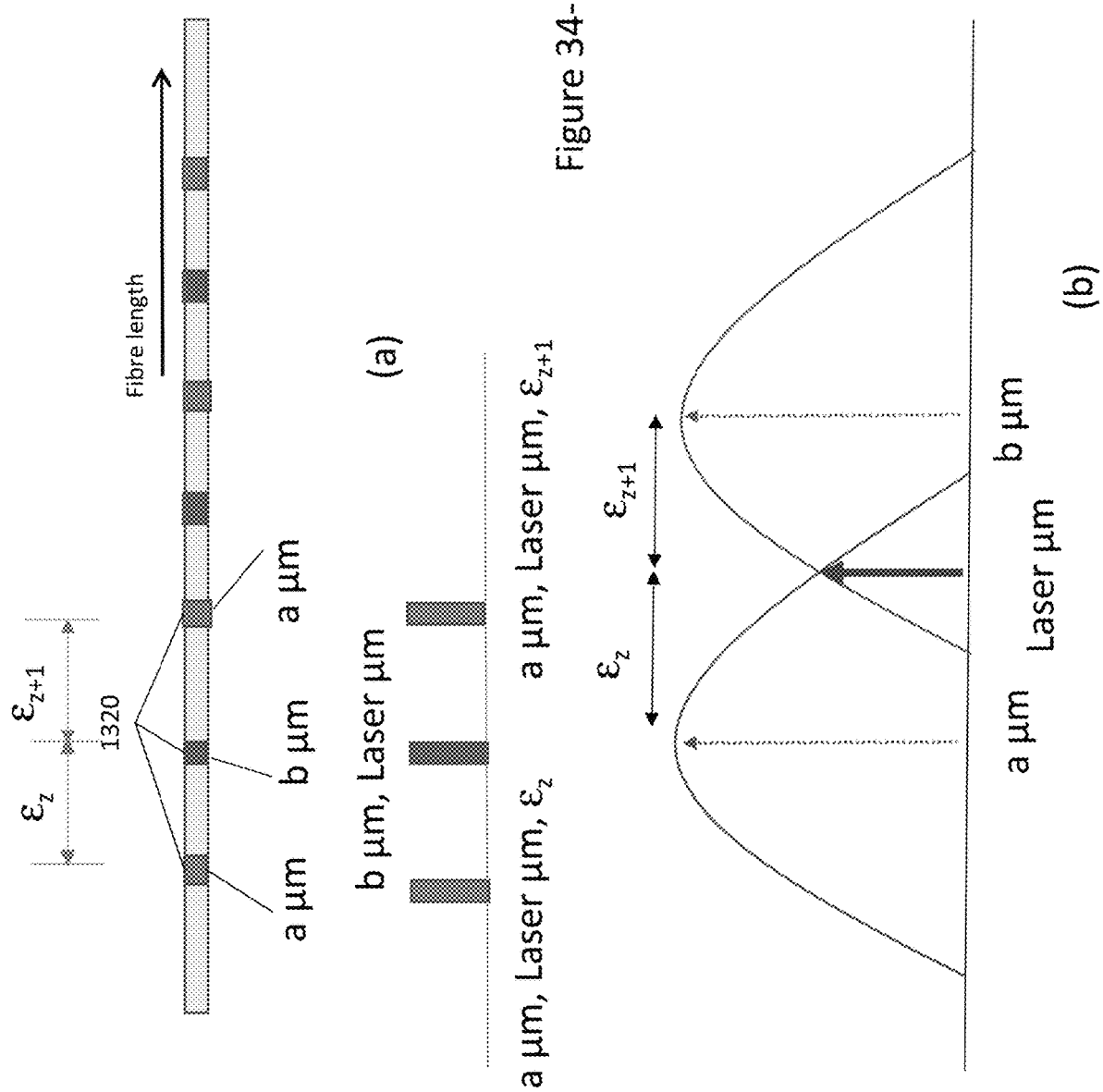
Figure 34:
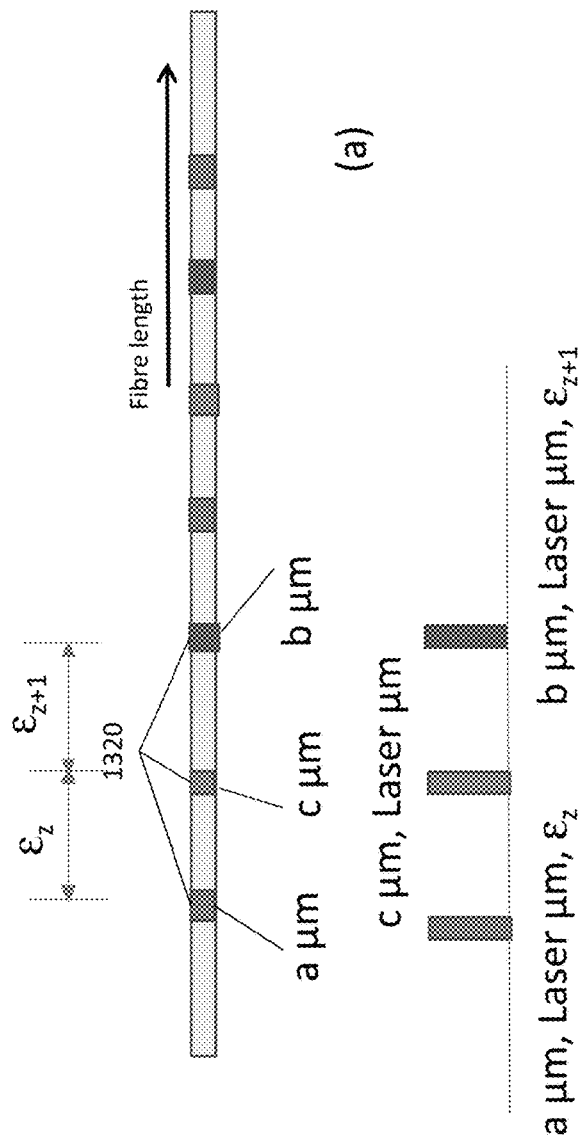
Figure 2:
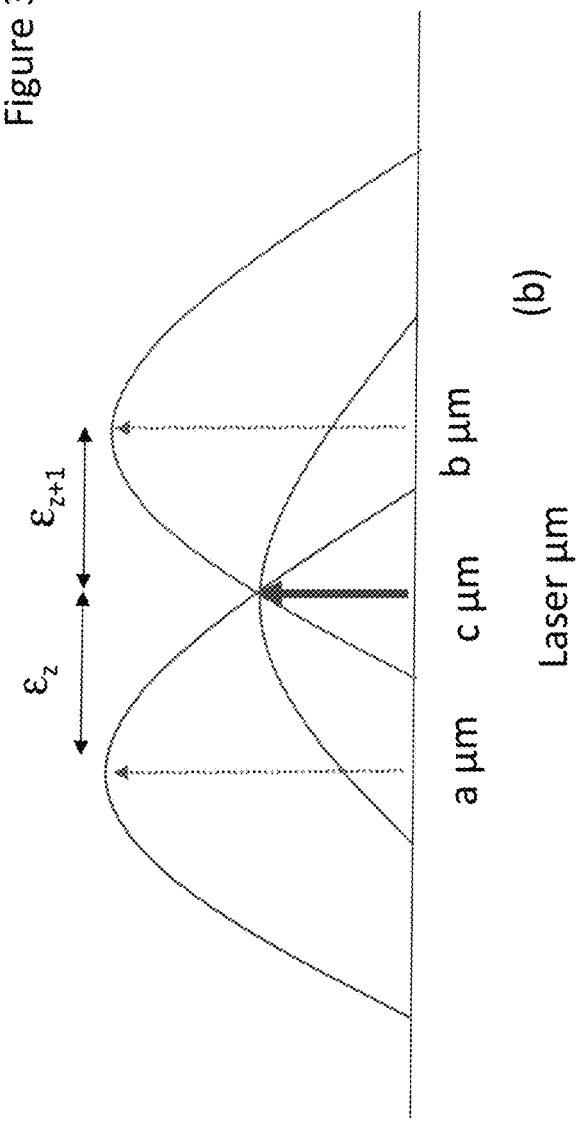

FIGS. 34-1 and 33-2 show a further embodiment of the invention. In FIG. 34-1, consecutive reflector portions 1320 alternate in reflecting different wavelengths a μm and b μm along the fibre, with particular respective reflection bandwidths, which overlap, as shown. The laser wavelength is selected to be within the overlapping wavelength region, such that it is reflected by all the reflector portions 1320, and specifically is a wavelength distance εz microns away from the center reflecting frequency of the reflector that reflects at a microns, and is a wavelength distance ε(z+1) away from the center reflecting frequency of the reflector that reflects at b microns. With such an arrangement it is possible to use the reflective bands to measure the change in the intensity of the reflectors directly, to thereby get a measure of the static strain along the fibre regions.

FIG. 34-2 builds upon the arrangement of FIG. 34-1, by providing that the reflectors 1320 have three respective reflecting wavelengths a microns, c microns, and b microns, in order, repeating along the fiber. The laser wavelength is at c microns, again separated from a microns by a wavelength distance εz microns away from the center reflecting frequency of the reflector that reflects at a microns, and again a wavelength distance ε(z+1) away from the center reflecting frequency of the reflector that reflects at b microns. Again, with such an arrangement it is possible to use the reflective bands to measure the change in the intensity of the reflectors directly, to thereby get a measure of the static strain along the fibre regions.

Turning to a consideration of the reflector spacing, the spacing between the reflectors need not be regular in embodiments of the invention, and a variable spacing is possible. The spacing may vary by as much as 10 to 20%, provided that there is pulse overlap between reflections from the actual pulse and virtual pulse in the interferometer.

In addition, and as mentioned previously, the grating spacing can change along the length of the fiber, for example the spacing may be larger between gratings the further along the fiber from the DAS. Moreover, the reflectivity of the gratings may also increase the further along the fiber from the DAS. One particularly preferred spacing of the reflectors is to have the spacing at half the gauge length of the DAS, being the length difference between the different arms of the interferometer in the DAS (e.g. so for 10 m gauge length we have a 5 m reflector spacing).

With respect to the specifications of the gratings forming the reflectors in embodiments of the invention, the gratings may be written into the fiber as the fiber is produced, as is known in the art or written in the fiber after the fiber has been produced, as is also known in the art. The reflective strength of each reflector may be between −30 and −60 dB, and more preferably −40 to −50 dB and even more preferably around −45 dB. The total reflectors reflectivity all-together may be between −10 and −30 dB.

Figure 36:
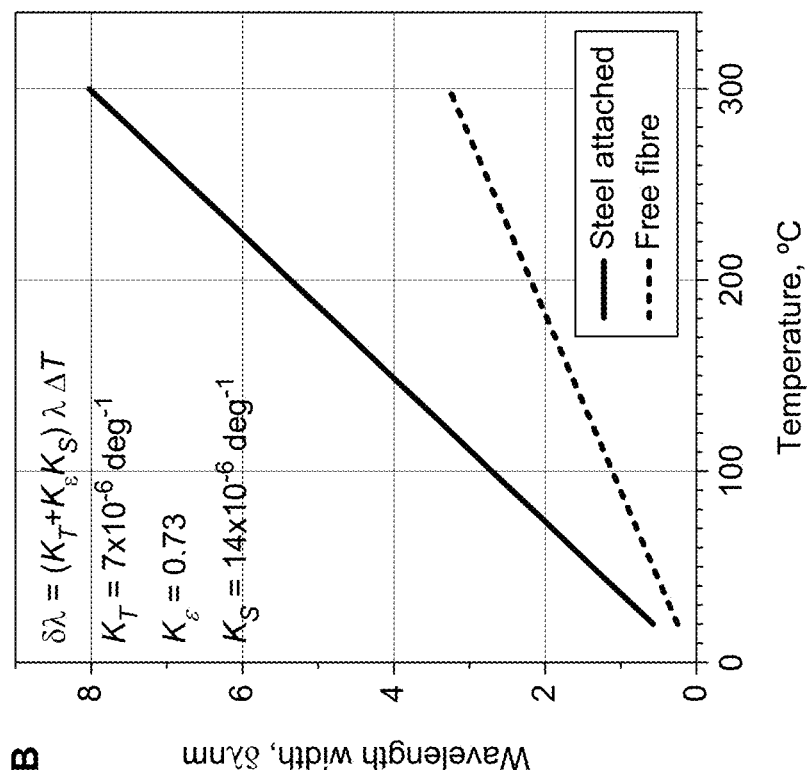
FIGS. 35 and 36 are graphs illustrating properties of the reflectors used in embodiments of the invention.
Figure 35:
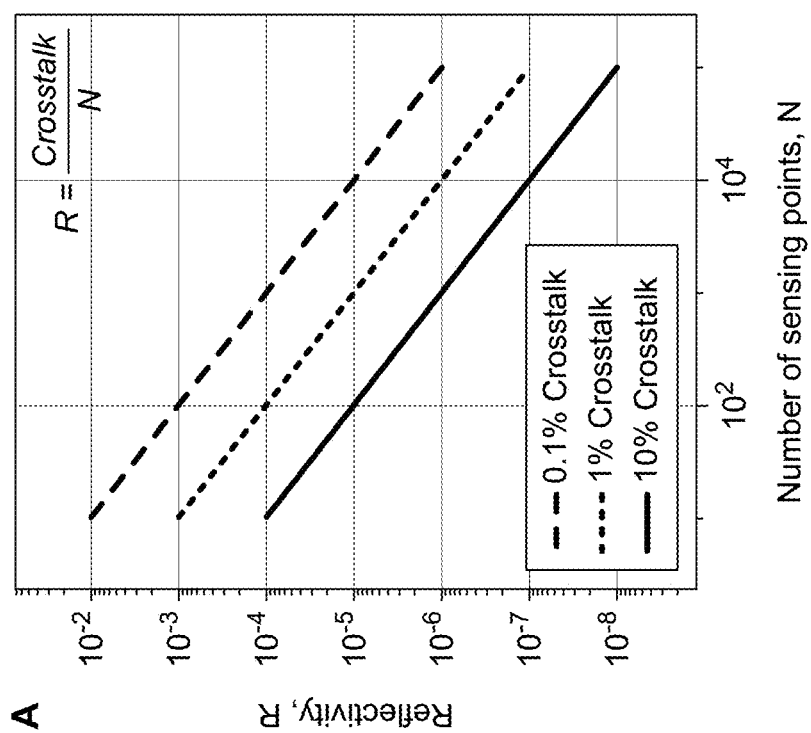

FIGS. 35 and 36 are two respective graphs, which further particularise the specifications of the reflectors, in terms of their number, their reflectivity, and the reflection bandwidth. Specifically, reviewing FIG. 35, it can be seen that the number of sensing points i.e. the number of reflectors is inversely related to the reflectivity of the reflectors, for a given acceptable level of cross-talk, in that more reflector points can be provided when the reflectivity of the reflector points is lower. Moreover, for a given number of reflectors, the reflectivity of those reflectors is also related to the desired or allowable cross-talk, in that if a higher cross-talk is acceptable, then a higher reflectivity can be used. Thus, when specifying a fiber for a particular application, the number of sensing points can first be specified, based on the sensing length of the fiber (i.e. the length over which sensing needs to take place), and the desired spatial resolution which in turn defines the spacing between the reflectors. Then, having determined the number of reflectors needed (in dependence on the desired length of fiber over which sensing needs to take place and the desired spatial resolution over that length), an acceptable level of cross-talk can then be specified, which in turn then allows the reflectivity of the reflectors to be determined, in accordance with the graphed functions.

Another consideration is the reflection wavelength width of the reflectors, concerning over what wavelength the reflectors reflect. FIG. 36 illustrates that the wavelength width is temperature dependent, in that temperature changes at the fibre cause the reflector grating reflection peak wavelength to change. In addition, a broad reflection bandwidth is also desirable in order to cope with changes in strain on the fibre in addition to changes in temperature. This is because strain as well as temperature changes the centre wavelength of a grating reflector.

As will be seen from FIG. 36, the desired wavelength width is operating temperature dependent, and also dependent on the condition of the fiber, for example whether it is attached to any structure or the like. Specifically, the desired wavelength width is proportionally related to the operating temperature range, in that the greater the temperature range, the greater the wavelength width required. In practice, a relatively broadband wavelength width around the laser wavelength is desirable, to allow for temperature changes irrespective of whether such changes take place. A linewidth of at least +/−2 nm, or more preferably at least +/−3 nm, or more preferably at least +/−4 nm, or even more preferably at least +/−5 nm is therefore desirable.

One parameter that can be used as a convenient design parameter for the fiber is the preferred "NR" (where NR is the number of markers (N) multiplied by average reflectivity (R) of the markers along the fiber) In order to obtain good performance, given the general aims of reducing crosstalk and providing the desired spatial resolution, a maximum NR of 10% is preferred.

Figure 37:
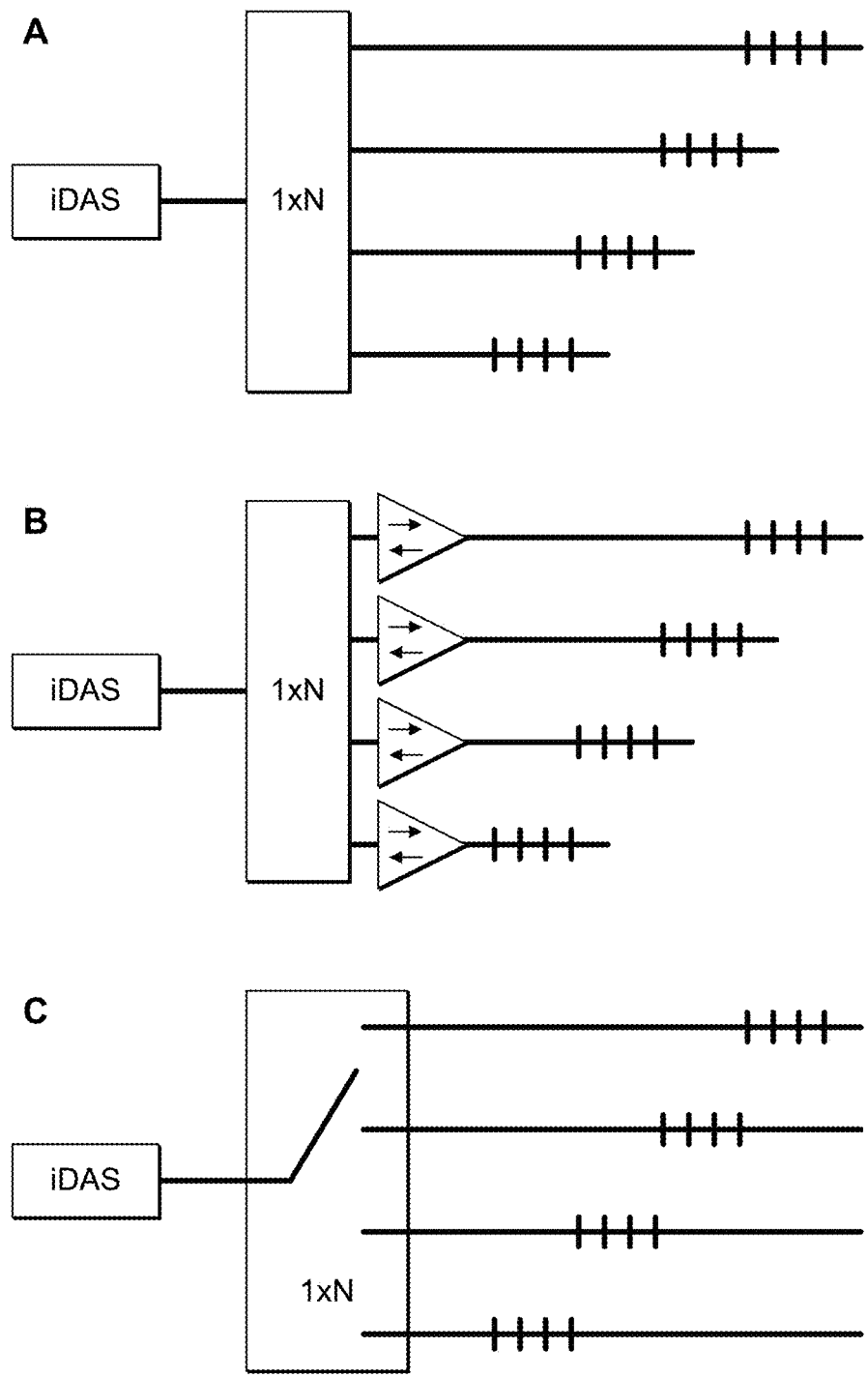
FIG. 37(*a*) to (*c*) are diagrams illustrating a further embodiment of the invention.

FIG. 37 shows a further embodiment that addresses the issue of crosstalk by making use of multiple fiber channels. These can be discrete individual fibers running together, for example in parallel, or could be a single multi-core fiber, or combinations of the two. Whatever the configuration of the fiber, the result is that multiple fiber channels are provided, which are multiplexed together at one end and connected to a DAS, the DAS being as described previously. The individual fiber channels are provided with respective regions therein where reflectors are provided, with the rest of the individual fiber channel being free of reflectors, to reduce cross talk and other losses. The longitudinal positioning of the respective regions from fiber to fiber along the length of the parallel fibers is such that regions are essentially longitudinally contiguous along, and either do not longitudinally overlap, or only very partially overlap.

The result of the above arrangement is that sensing can be provided as if a single fiber had reflectors all the way therealong, but with much reduced crosstalk than such a case. This is because per parallel fiber channel there are in fact fewer reflectors, than the case of a single fiber, by a factor related to the number of individual fiber channels. For example, where there are 4 fiber channels, then the number of reflectors which would otherwise be required to provide sensing at the desired spatial resolution all along a single fiber length can be divided into 4 groups, one group per fiber, located longitudinally along the fibers in respective contiguous groups, as shown. This means that the number of reflector points per individual fiber channel is also reduced to a quarter of the number, which from FIG. 35 above, means that for a given desired level of crosstalk a higher reflectivity can be used, or conversely, for the same reflectivity a lower level of crosstalk is obtained.

In order to implement the above an arrangement such as that shown in FIG. 37(b) or (c) should be used. Unfortunately, simple light separation with a 1×N coupler as shown in FIG. 37(a) cannot be used, because coupler losses mean that the reflected light reaching the DAS system remains the same. However, the coupler losses can be overcome by making use of bidirectional application on each fiber length, as shown in FIG. 37(B), or by fast optical switching between the individual parallel fiber lengths, as shown in FIG. 37(c). Fast integrated optical switches with 2 ns switching times are available, from companies such as PhotonIC Corp, of Culver City, Calif., USA.

The above described embodiments have focussed on the application of the invention to an optical fiber distributed acoustic sensor system. However, the optical fiber described herein can also be used with optical fiber distributed temperature sensor systems, such as the Silixa® Ultima™ DTS system, described at http://silixa.com/technology/ultima-dts/. For example, the prior art Silixa® Ultima™ DTS system can measure 0.3 nm for 10 m gauge length, and hence for 10 cm gauge length the resolution would be 30 nm. The fibre temperature coefficient is about $10^{-5}/°$ K/m. For 10 cm 1 um/° K. or 1 nm/° mK. However, using a sensing fiber with wideband weak reflectors therein as described above we can improve by ×10 and therefore for 10 cm we should be able to measure 3° mK at 10 kHz. Averaging to 10 Hz the performance should then approach 0.1° mK.

In summary, therefore, embodiments of the present invention provide an improved optical fiber distributed sensor system that makes use of a specially designed optical fiber to improve overall sensitivity of the system, in some embodiments by a factor in excess of 10. This is achieved by inserting into the fiber weak broadband reflectors periodically along the fiber. The reflectors reflect only a small proportion of the light from the DAS incident thereon back along the fiber, typically in the region of 0.001% to 0.1%, but preferably around 0.01% reflectivity per reflector. In addition, to allow for temperate compensation to ensure that the same reflectivity is obtained if the temperature changes, the reflection bandwidth is relatively broadband i.e. in the region of +/−3 nm to +/−5 nm from the nominal laser wavelength. In some embodiments the reflectors are formed from a series of fiber Bragg gratings, each with a different center reflecting frequency, the reflecting frequencies and bandwidths of the gratings being selected to provide the broadband reflection. In other embodiments a chirped grating may also be used to provide the same effect. In preferred embodiments, the reflectors are spaced at half the gauge length i.e. the desired spatial resolution of the optical fiber sensor system. The optical fiber distributed sensor system may be any of an acoustic sensor system, vibrational sensor system, temperature sensor system, or any other sensed parameter that perturbs the path length of the optical fiber.

Various further modifications, whether by way of addition, deletion, or substitution may be made to above mentioned embodiments to provide further embodiments, any and all of which are intended to be encompassed by the appended claims.

What is claimed is:

1. An optical fiber distributed sensor system, comprising:
   an optical source arranged in use to produce optical signal pulses;
   an optical fiber deployable in use in an environment to be sensed and arranged in use to receive the optical signal pulses; and
   sensing apparatus arranged in use to detect light from the optical signal pulses reflected back along the optical fiber and to determine any one or more of an acoustic, vibration, or temperature parameter that perturbs the path length of the optical fiber in dependence on the reflected light;
   the system being characterized in that the optical fiber comprises a plurality of reflector portions distributed along its length in at least a first sensing region thereof, the reflectivity of the reflector portions being:
i) inversely dependent on the number of reflector portions in the at least first sensing region; and
ii) dependent on a selected amount of crosstalk between the reflector portions in the at least first sensing region;
wherein a gauge length of the sensor system is dependent on i) the spacings between the reflector portions; and/or ii) the timing characteristics of the optical signal pulses, wherein the gauge length of the sensor system is a minimum length of fiber over which an acoustic, vibration, or temperature signal incident on the fiber can be resolved.

2. A system according to claim 1, wherein the reflector portions have a small reflectance over a large bandwidth.

3. A system according to claim 2, wherein the reflector reflectance is less than 1%.

4. A system according to claim 2, wherein the reflector reflectance is less than 0.1% and more than 0.001%.

5. A system according to claim 1, wherein at least one of the reflector portions comprises a plurality of fiber Bragg gratings; and wherein the plurality of fiber Bragg gratings are arranged in an array along a reflector portion, individual gratings in the array having non-identical but overlapping reflection bandwidths to the other gratings in the array whereby to provide a broadband reflector.

6. A system according to claim 1, wherein a reflector portion comprises a chirped grating.

7. A system according to claim 1, wherein the reflector portions are regularly distributed along the length of the fiber in at least the first sensing region.

8. An optical fiber distributed sensor system, comprising:
an optical source arranged in use to produce optical signal pulses;
an optical fiber deployable in use in an environment to be sensed and arranged in use to receive the optical signal pulses; and
sensing apparatus arranged in use to detect light from the optical signal pulses reflected back along the optical fiber and to determine any one or more of an acoustic, vibration, or temperature parameter that perturbs the path length of the optical fiber in dependence on the reflected light;
the system being characterized in that the optical fiber comprises a plurality of reflector portions distributed along its length in at least a first sensing region thereof, the reflectivity of the reflector portions being:
i) inversely dependent on the number of reflector portions in the at least first sensing region; and
ii) dependent on a selected amount of crosstalk between the reflector portions in the at least first sensing region;
wherein the spacings between the reflector portions are set in dependence on a gauge length of the sensor system, wherein the gauge length of the sensor system is a minimum length of fiber over which an acoustic, vibration, or temperature signal incident on the fiber can be resolved.

9. A system according to claim 8, wherein the reflector portions have a small reflectance over a large bandwidth.

10. A system according to claim 9, wherein the reflector reflectance is less than 1%.

11. A system according to claim 9, wherein the reflector reflectance is less than 0.1% and more than 0.001%.

12. A system according to claim 8, wherein at least one of the reflector portions comprises a plurality of fiber Bragg gratings, wherein the plurality of fiber Bragg gratings are arranged in an array along a reflector portion, individual gratings in the array having non-identical but overlapping reflection bandwidths to the other gratings in the array whereby to provide a broadband reflector.

13. A system according to claim 8, wherein a reflector portion comprises a chirped grating.

14. A system according to claim 8, wherein the reflector portions are regularly distributed along the length of the fiber in at least the first sensing region.

15. An optical fiber distributed sensor system, comprising:
an optical source arranged in use to produce optical signal pulses;
an optical fiber deployable in use in an environment to be sensed and arranged in use to receive the optical signal pulses; and
sensing apparatus arranged in use to detect light from the optical signal pulses reflected back along the optical fiber and to determine any one or more of an acoustic, vibration, or temperature parameter that perturbs the path length of the optical fiber in dependence on the reflected light;
the system being characterized in that the optical fiber comprises a plurality of reflector portions distributed along its length in at least a first sensing region thereof, the reflectivity of the reflector portions being:
i) inversely dependent on the number of reflector portions in the at least first sensing region; and
ii) dependent on a selected amount of crosstalk between the reflector portions in the at least first sensing region;
wherein the spacings between the reflector portions and/or the timing characteristics of the optical signal pulses are selected such that a dual resolution output signal is obtained, that alternates between a first spatial resolution and a second spatial resolution as the optical signal pulses travel along the fiber.

16. A system according to claim 15, whereby the spacings between the reflector portions are less than a sum of the pulse width and the pulse separation of the optical signal pulses.

17. A system, according to claim 16, wherein the second spatial resolution is twice that of the first spatial resolution.

18. A system according to claim 15, wherein the reflector portions have a small reflectance over a large bandwidth.

19. A system according to claim 9, wherein the reflector reflectance is less than 0.1%.

* * * * *